United States Patent
Zha et al.

(10) Patent No.: US 11,792,099 B2
(45) Date of Patent: Oct. 17, 2023

(54) TROUBLESHOOTING METHOD, DEVICE, AND READABLE STORAGE MEDIUM

(71) Applicant: HUAWEI TECHNOLOGIES CO., LTD., Guangdong (CN)

(72) Inventors: Min Zha, Shenzhen (CN); Qichang Chen, Shenzhen (CN); Dongdong He, Shenzhen (CN); Xiong Yang, Dongguan (CN); Lehong Niu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/940,560

(22) Filed: Sep. 8, 2022

(65) Prior Publication Data
US 2023/0018911 A1    Jan. 19, 2023

Related U.S. Application Data

(63) Continuation of application No. PCT/CN2021/077438, filed on Feb. 23, 2021.

(30) Foreign Application Priority Data

Mar. 11, 2020   (CN) .................. 202010166508.4

(51) Int. Cl.
*H04L 43/0811*    (2022.01)
*H04L 41/0663*    (2022.01)

(52) U.S. Cl.
CPC ...... *H04L 43/0811* (2013.01); *H04L 41/0663* (2013.01)

(58) Field of Classification Search
None
See application file for complete search history.

(56) References Cited

U.S. PATENT DOCUMENTS

| 8,259,590 B2 | 9/2012 | Shah et al. |
| 2005/0201409 A1 | 9/2005 | Griswold et al. |

(Continued)

FOREIGN PATENT DOCUMENTS

| CN | 1791049 A | 6/2006 |
| CN | 1913414 A * | 2/2007 |

(Continued)

OTHER PUBLICATIONS

[No Author listed], "Huawei: Tomorrow's Super Supplier of Smart Electric Vehicles," Electric Vehicle Observer, Oct. 9, 2020, 10 pages (partial English translation).

(Continued)

*Primary Examiner* — Mohamed A. Wasel
*Assistant Examiner* — James Ross Hollister
(74) *Attorney, Agent, or Firm* — Fish & Richardson P.C.

(57) ABSTRACT

A troubleshooting method, a device, and a readable storage medium are provided, to detect a unidirectional fault in a ring Ethernet and provide a fault recovery mechanism after the unidirectional fault occurs. In embodiments of this application, if determining that a link corresponding to a receiving unit of a first port is in a fault status, the first device performs loopback on the first port, and sends a first continuity check message to a second device via the first port. The first continuity check message carries first indication information. The first indication information indicates that a link corresponding to a receiving unit of a port that sends the first indication information is in a fault status.

18 Claims, 12 Drawing Sheets

(56) References Cited

U.S. PATENT DOCUMENTS

| | | | |
|---|---|---|---|
| 2005/0265330 A1 | 12/2005 | Suzuki et al. | |
| 2009/0196172 A1* | 8/2009 | Long ..................... | H04L 45/22 370/242 |
| 2010/0246412 A1* | 9/2010 | Washam ................. | H04L 1/24 370/248 |
| 2015/0244606 A1 | 8/2015 | Chang | |

FOREIGN PATENT DOCUMENTS

| | | |
|---|---|---|
| CN | 1913414 A | 2/2007 |
| CN | 101043383 A | 9/2007 |
| CN | 101183902 A | 5/2008 |
| CN | 101212366 A | 7/2008 |
| CN | 102035695 A | 4/2011 |
| CN | 102932172 A | 2/2013 |
| CN | 106888142 A | 6/2017 |
| EP | 2051447 A1 | 4/2009 |

OTHER PUBLICATIONS

IEEE 802.3-2018, "IEEE Standard for Ethernet," May 18, 2017, 12 pages.
IEEE Std 802.1Q-2018, "IEEE Standard for Local and Metropolitan Area Network-Bridges and Bridged Networks," Jul. 6, 2018, 1993 pages.
International Search Report and Written Opinion in International Appln. No. PCT/CN2021/077438, dated Apr. 28, 2021, 16 pages (with English translation).
Extended European Search Report in European Appln No. 21768109.7, dated Jun. 29, 2023, 8 pages.

\* cited by examiner

| Preamble + Start of frame delimiter (Preamble + Start of frame delimiter) | Destination MAC (MAC destination) | Source MAC (MAC source) | 802.1Q tag (optional) (802.1Q tag (optional)) | Ethernet type (EtherType) | MD level (MD Level) | Version (Version) | Operating code (OpCode) | Flag (Flags) | First TLV offset (First TLV offset) | Serial Number | Reserved bit (Reserved) | FCS-frame check sequence (FCS-Frame check sequence (32-bit CRC)) |
|---|---|---|---|---|---|---|---|---|---|---|---|---|
| | | | | | | | | CCM interval (CCM Interval) | | | Value of a local fault register (ccm_local_r x_fault_flag) | |
| 8 octet (octets) | 6 octet (octets) | 6 octet (octets) | 4 octet (octets) | 2 octet (octets) | 3 bits | 5 bits | 1 octet (octets) | 7 bits (bits) | 1 octet (octets) | 4 octet (octets) | 66 octet (octets) | 4 octet (octets) |
| | 01-80-C2-00-00-30 | | | 0x89-02; LLRE CCM uses the same Ethertype | 0 | 0 | 0x0060; correspon ding to OpCode 96 in decimal, | 0: reserved; 0b0000001: 100 μs period; 0b0000010: 200 μs period; 0b0000011: 300 μs period; | 0b0: no local fault is detected on a ring network port; 0b1: a local fault is | 0; currently unavailable; filled with 0, and reserved for future | All filled with 0; keeping payload consistent with 8021.1Q | |

FIG. 4

Con't of FIG. 4

| Preamble + Start of frame delimiter (Preamble + Start of frame delimiter) | Destination MAC (MAC destination) | Source MAC (MAC source) | 802.1Q tag (optional) (802.1Q tag (optional)) | Ethernet type (EtherType) | MD level (MD Level) | Version (Version) | Operating code (OpCode) | Flag (Flags) | First TLV offset (First TLV offset) | Serial Number | Reserved bit (Reserved) | FCS-frame check sequence (FCS-Frame check sequence (32-bit CRC)) |
|---|---|---|---|---|---|---|---|---|---|---|---|---|
| | | | | 89-02 as the CCM in IEEE 802.1Q-2018 | | | reserved OpCode in IEEE 802.1 | 0b0000100: 600 μs period; 0b0000101: 1 ms period; 0b0000110: 3.3 ms period; 0b0000111 to 0b1111111: reserved; | detected on a ring network port; | potential use; | CCM packet payload 74 octets | |

FIG. 4

TROUBLESHOOTING METHOD, DEVICE, AND READABLE STORAGE MEDIUM

CROSS-REFERENCE TO RELATED APPLICATIONS

This application is a continuation of International Application No. PCT/CN2021/077438, filed on Feb. 23, 2021, which claims priority to Chinese Patent Application No. 202010166508.4, filed on Mar. 11, 2020. The disclosures of the aforementioned applications are hereby incorporated by reference in their entirety.

TECHNICAL FIELD

This application relates to the communication field, and in particular, to a troubleshooting method, a device, and a readable storage medium.

BACKGROUND

Different from carriers' mobile bearer networks, wide area networks, and provincial backbone networks, in-vehicle communication network has the following features: The cable length is short, and the length of a single cable does not exceed 15 m; there are higher requirements on temperature tolerance, anti-electromagnetic interference (EMC, EMI), and reliability (shorter fault recovery time); there are extremely short network startup time and lower end-to-end communication latency; and repeatability/predictability of service traffic transmission behavior.

Ethernet-related standards released by the IEEE 802.3 working group are greatly popular in the network industry. Ethernet is widely welcomed by network vendors due to a concise and best-effort transmission mode and a standardized interconnection mechanism. With a trend toward electric and intelligent automobiles, the in-vehicle communication network of automobiles is evolving toward Ethernet. The in-vehicle communication network may have a ring network architecture. FIG. 1a is an example schematic diagram of a ring network architecture. As shown in FIG. 1a, a sensor device such as light detection and ranging may be connected to a ring network via the Ethernet.

As shown in FIG. 1a, the ring network includes a first device, a second device, a third device, and a fourth device. Each device may periodically send a continuity check message (continuity check message, CCM) via ports, to determine whether a fault occurs on a link. It is specified in the conventional technology that if no CCM message is received within preset duration (for example, 3.5 CCM periods), it is determined that the fault occurs on the link. As shown in FIG. 1a, if the first device receives no CCM within the preset duration via a first port, the first device determines that the fault occurs on a link between the first port and a third port. If the second device receives no CCM within preset duration via the third port, the second device determines that a fault occurs on a link between the third port and the first port.

FIG. 1B shows an example of another possible scenario. As shown in FIG. 1B, it is assumed that a fault occurs on a unidirectional link between the third port and the first port, that is, the fault occurs on a link between a receiving unit of the third port and a sending unit of the first port, but a link between a sending unit of the third port and a receiving unit of the first port is not faulty. In this case, the first device cannot receive a message sent by the second device via the third port, but the second device can still receive a message from the first port of the first device. For the scenario shown in FIG. 1B, a determining rule "if no CCM message is received within preset duration, it is determined that the fault occurs on the link" stipulated in the conventional technology is applied. Then only the first device can determine that the fault occurs on the link between the first port and the third port, but the second device cannot determine that the fault occurs on the link between the first port and the third port. In this case, the second device still continues to send data via the third port, resulting in a data packet loss.

SUMMARY

Embodiments of this application provide a troubleshooting method, a device, and a readable storage medium, to more accurately determine an interface fault of a device and improve a packet transmission success rate.

According to a first aspect, an embodiment of this application provides a troubleshooting method. A network architecture to which the method is applicable includes a first device and a second device. A first port of the first device is connected to a third port of the second device. In the method, the first device determines that a link corresponding to a receiving unit of the first port is in a fault status; the first device sends a first continuity check message to the second device via a sending unit of the first port. The first continuity check message carries first indication information. The first indication information indicates that a link corresponding to a receiving unit of a port that sends the first indication information is in the fault status. In this way, the second device may determine, based on the first indication information in the received first continuity check message, that a fault occurs on the link corresponding to the receiving unit of the first port (namely, a link corresponding to a sending unit of the third port), in other words, a remote fault occurs on the third port.

In a possible implementation, after the first device determines that the link corresponding to the receiving unit of the first port is in the fault status, for a first data packet to be sent by the sending unit of the first port, the first device may send the first data packet to the receiving unit of the first port via the sending unit of the first port. When a local fault occurs on the first port, a transmission service may continue to be provided to the first data packet in a loopback mode. That is, an available transmission service can still be provided if a single point of failure occurs on an in-vehicle ring network, to transfer a service data packet to a destination device. Therefore, reliability of data transmission can be improved.

In a possible implementation, the network architecture to which the method is applicable further includes a third device, and a second port of the first device is connected to an eighth port of the third device. In the possible implementation, the first device determines that a link corresponding to a receiving unit of the second port is in a non-fault status; the first device sends a fifth continuity check message to the third device via a sending unit of the second port. The fifth continuity check message carries second indication information. The second indication information indicates that a link corresponding to a receiving unit of a port that sends the second indication information is in the non-fault status. When a device has a plurality of ports, not all continuity check messages sent by the ports are the same. Instead, when a local fault occurs on a port, a continuity check message sent via the port carries the first indication information; when no local fault occurs on the port, the continuity check message sent via the port carries the second indication information. In this way, the communication device can determine, based on a specific port via which the first indication information is received, that a remote fault occurs on the specific port.

In a possible implementation, after the first device sends the first continuity check message via the sending unit of the first port, it is assumed that the first device receives a third continuity check message via the first port, where the third continuity check message carries the first indication information. In this case, for a first data packet that to be forwarded by the sending unit of the first port, the first device may further send the first data packet to the receiving unit of the first port via the sending unit of the first port. The first device sends the second continuity check message to the second device via the sending unit of the first port. The second continuity check message carries the second indication information. The second indication information indicates that the link corresponding to the receiving unit of the port that sends the second indication information is in the non-fault status. The first indication information indicates that a fault occurs on the link corresponding to the receiving unit of the port that sends the first indication information. Therefore, if the first device receives the first indication information via the first port, it indicates that the fault occurs on a link corresponding to a receiving unit of the third port, where the third port is a peer end of the first port. In addition, the link corresponding to the receiving unit of the third port is a link corresponding to the sending unit of the first port. Therefore, when receiving the first indication information via the first port, the first device may determine that the fault occurs on the link corresponding to the sending unit of the first port, in other words, determine that the first port is in a remote fault status.

In a possible implementation, that the first device determines that a link corresponding to a receiving unit of the first port is in a fault status includes: If either of the following conditions is satisfied, the first device determines that the link corresponding to the receiving unit of the first port is in the fault status: A total quantity of third continuity check packets and fourth continuity check packets received via the first port within preset first duration is not greater than a first quantity, where the third continuity check packet carries the first indication information, the fourth continuity check packet carries the second indication information, and the second indication information indicates that the link corresponding to the receiving unit of the port that sends the second indication information is in the non-fault status; the link corresponding to the receiving unit of the first port is in a disconnected status.

In a possible implementation, after the first device determines that a link corresponding to a receiving unit of the first port is in a fault status, the following is also included: It is assumed that the first device receives a second quantity of fourth continuity check messages via the first port, where the fourth continuity check message carries the second indication information, and the second indication information indicates that the link corresponding to the receiving unit of the port that sends the second indication information is in the non-fault status. In this case, the first device sends the second continuity check message to the second device via the sending unit of the first port, where the second continuity check message carries the second indication information, and the second indication information indicates that the link corresponding to the receiving unit of the port that sends the second indication information is in the non-fault status. In this way, when the first device receives a second quantity of fourth continuity check messages via the first port, the first device may determine that links corresponding to the receiving unit and the sending unit of the first port are both in the non-fault status.

In a possible implementation, after the first device receives a second quantity of fourth continuity check messages via the first port, the following is also included: For the first data packet to be sent by the sending unit of the first port, the first device sends the first data packet to the second device via the first port. In this way, when the first device determines that the links corresponding to the receiving unit and the sending unit of the first port are both in the non-fault status, loopback can be canceled.

According to a second aspect, an embodiment of this application provides a troubleshooting method, including: A second device receives a first continuity check message from a first port of a first device via a third port, where the first continuity check message carries first indication information, and the first indication information indicates that a link corresponding to a receiving unit of a port that sends the first indication information is in a fault status; for a second data packet to be sent by a sending unit of the third port, the second device sends the second data packet to a receiving unit of the third port via the sending unit of the third port. In this way, the second device may determine, based on the first indication information, that a fault occurs on a link corresponding to a receiving unit of the first port (namely, a link corresponding to the sending unit of the third port), in other words, a remote fault occurs on the third port.

In a possible implementation, after the second device receives the first continuity check message via the third port, the following is also included: The second device sends fourth continuity check message to the first port of the first device via the sending unit of the third port. The fourth continuity check message carries second indication information. The second indication information indicates that a link corresponding to a receiving unit of a port that sends the second indication information is in a non-fault status. In this way, the first device may determine, based on whether the fourth continuity check message is received, whether the link corresponding to the receiving unit of the first port is in the fault status.

In a possible implementation, the method further includes: If the second device determines that a link corresponding to the receiving unit of the third port is in the fault status, the second device sends third continuity check message to the first device via the sending unit of the third port. The third continuity check message carries the first indication information. The first indication information indicates that the link corresponding to the receiving unit of the port that sends the first indication information is in the fault status. In this way, the first device may determine, based on the first indication information, that the fault occurs on a link corresponding to a sending unit of the first port (namely, the link corresponding to the receiving unit of the third port), in other words, a remote fault occurs on the first port.

In a possible implementation, after the second device determines that the link corresponding to the receiving unit of the third port is in the fault status, the following is also included: For the second data packet to be forwarded by the sending unit of the third port, the second device sends the second data packet to a receiving unit of the third port via the sending unit of the third port. When a local fault occurs on the third port, a transmission service may continue to be provided to the second data packet in a loopback mode. That is, an available transmission service can still be provided if a single point of failure occurs on an in-vehicle ring network, to transfer a service data packet to a destination device. Therefore, reliability of data transmission can be improved.

In a possible implementation, if the second device determines that a total quantity of first continuity check packets and second continuity check packets received via the third port within preset first duration is not greater than a first quantity, and/or the link corresponding to the receiving unit of the third port is in a disconnected status, the link corresponding to the receiving unit of the third port is in the fault status.

In a possible implementation, after the second device receives the first continuity check message from the first port of the first device via the third port, it is assumed that the second device receives a second quantity of second continuity check messages via the third port, where the second continuity check message carries the second indication information, and the second indication information indicates that the link corresponding to the receiving unit of the port that sends the second indication information is in the non-fault status. In this case, the second device may further send the fourth continuity check message to the first device via the sending unit of the third port, where the fourth continuity check message carries the second indication information, and the second indication information indicates that the link corresponding to the receiving unit of the port that sends the second indication information is in the non-fault status. In this way, when the second device receives the second quantity of second continuity check messages via the third port, the second device may determine that links corresponding to the receiving unit and the sending unit of the third port are both in the non-fault status.

In a possible implementation, after the second device receives the second quantity of second continuity check messages via the third port, the following is also included: For the second data packet to be sent by the sending unit of the third port, the second device sends the second data packet to the first device via the third port. In this way, when the second device determines that the links corresponding to the receiving unit and the sending unit of the third port are both in the non-fault status, loopback can be canceled.

Corresponding to any troubleshooting method according to the first aspect and the second aspect, this application further provides a communication device. The communication device may be any transmit end device or receive end device that transmits data in a wireless manner, for example, a communication chip, or a network device (for example, a base station). In a communication process, a transmit end device and a receive end device are opposite to each other. In some communication processes, the communication device may be used as the foregoing network device or a communication chip that can be used for the network device.

According to a third aspect, a communication device is provided, including different ports and processing units. Each port includes a corresponding sending unit and a corresponding receiving unit. The processing unit cooperates with sending units and receiving units on different ports to perform any implementation of the troubleshooting method according to the foregoing first aspect and the foregoing second aspect. The sending unit and the receiving unit are configured to perform functions related to sending and receiving. In a design, the communication device may be a communication chip, and the sending unit and the receiving unit may be an input/output circuit or a port of the communication chip.

In another design, the sending unit may be a transmitter or a transmitter machine, and the receiving unit may be a receiver or a receiver machine.

Optionally, the communication device further includes modules that are configured to perform any implementation of any troubleshooting method according to the foregoing first aspect and the foregoing second aspect.

According to a fourth aspect, a communication device is provided. The communication device may be a network device, for example, may be the foregoing first device or the foregoing second device, and includes a processor and a memory. Optionally, the communication device further includes a receiver and a transmitter. The memory is configured to store a computer program or instructions. The processor is configured to invoke the computer program or the instructions from the memory and run the computer program or the instructions. When the processor executes the computer program or the instructions in the memory, the communication device is enabled to perform any implementation of any troubleshooting method according to the foregoing first aspect and the foregoing second aspect.

Optionally, there may be one or more processors, and one or more memories. Optionally, the memory may be integrated with the processor, or the memory and the processor are disposed separately.

Optionally, the receiver may be a receiver machine, and the transmitter may be a transmitter machine.

According to a fifth aspect, a communication device is provided, which includes a processor. The processor is coupled to a memory, and may be configured to perform the method according to either of the first aspect and the second aspect and any one of the possible implementations of the first aspect and the second aspect. Optionally, the communication device may further include the memory. Optionally, the communication device may further include a transmit interface and a receive interface, and the processor is coupled to the transmit interface and the receive interface.

In an implementation, the communication device may be a network device. When the communication device is a network device, the transmit interface may be a transmitter or an output interface, and the receive interface may be a receiver or an input interface. Optionally, the receiver may be a receive circuit, and the transmitter may be a transmit circuit. Optionally, the input/output interface may be an input/output circuit.

In another implementation, the communication device may be a chip or a chip system. When the communication device is a chip or a chip system, the receive/transmit interface may be an input/output interface, an interface circuit, an input/output circuit, a pin, a related circuit, or the like on the chip or the chip system. The processor may alternatively be embodied as a processing circuit or a logic circuit.

According to a sixth aspect, a system is provided. The system includes the foregoing network device, for example, includes a first device, a second device, and a third device.

According to a seventh aspect, a computer program product is provided. The computer program product includes a computer program (which may also be referred to as code or instructions). When the computer program is run, a computer is enabled to perform the method according to any possible implementation of the foregoing first aspect, or the computer is enabled to perform the method according to any implementation of the foregoing first aspect and the foregoing second aspect.

According to an eighth aspect, a computer-readable storage medium is provided. The computer-readable storage medium stores a computer program (which may also be referred to as code or instructions). When the computer program is run on a computer, the computer is enabled to perform the method according to any possible implementation of the foregoing first aspect, or perform the method according to any implementation of the first aspect and the second aspect.

According to a ninth aspect, a processing apparatus is provided, and includes an input circuit, an output circuit, and a processing circuit. The processing circuit is configured to receive a signal by using the input circuit, and send a signal by using the output circuit, so that the method in either of the first aspect and the second aspect and any one of the possible implementations of the first aspect and the second aspect is implemented.

In a specific implementation process, the foregoing processing apparatus may be a chip, the input circuit may be an input pin, the output circuit may be an output pin, and the processing circuit may be a transistor, a gate circuit, a trigger, any logic circuit, or the like. An input signal received by the input circuit may be received and input by, for example, but not limited to, a receiver, a signal output by the output circuit may be output to, for example, but not limited to, a transmitter and sent by the transmitter, and the input circuit and the output circuit may be a same circuit, where the circuit is used as the input circuit and the output circuit at different moments. Specific implementations of the processor and the various circuits are not limited in embodiments of this application.

BRIEF DESCRIPTION OF DRAWINGS

FIG. 2b is a schematic diagram of a data transmission solution in FIG. 2a;

FIG. 4 is a schematic diagram of a continuity check packet to which an embodiment of this application is applicable;

DESCRIPTION OF EMBODIMENTS

Figure 1A:
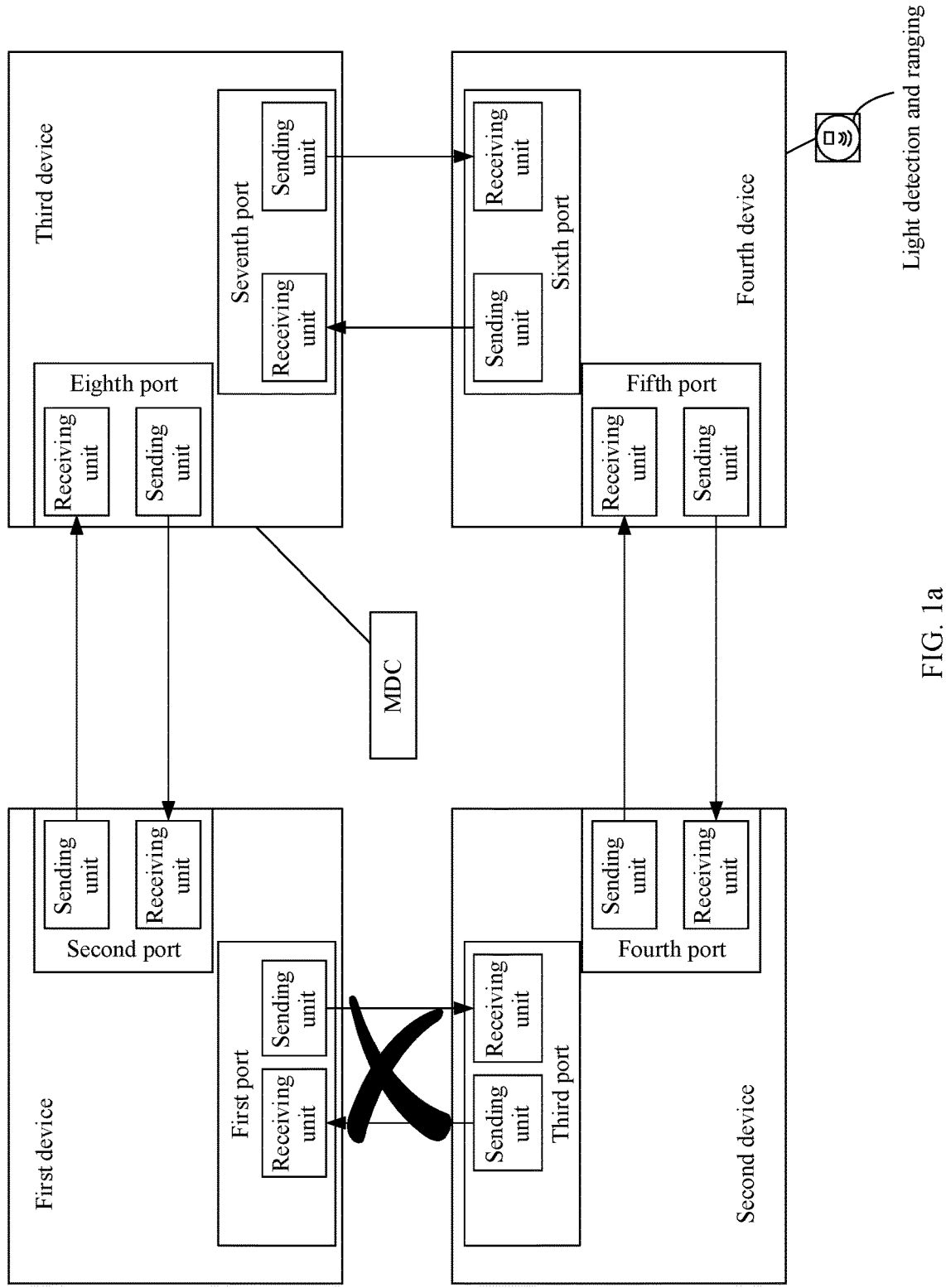
FIG. 1a is a schematic diagram of a ring network architecture.
Figure 1B:
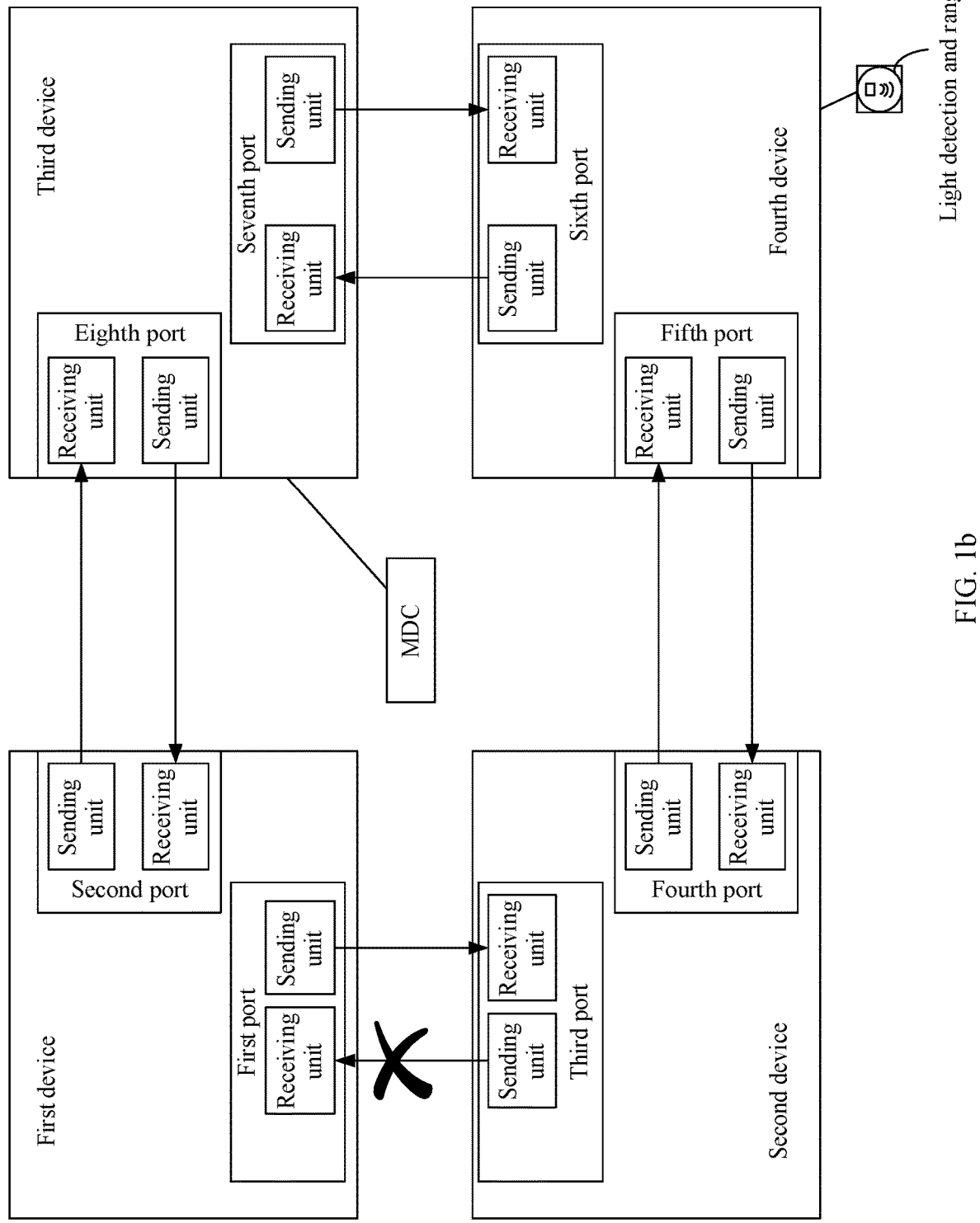
FIG. 1B is a schematic diagram of another ring network architecture.
Figure 2A:
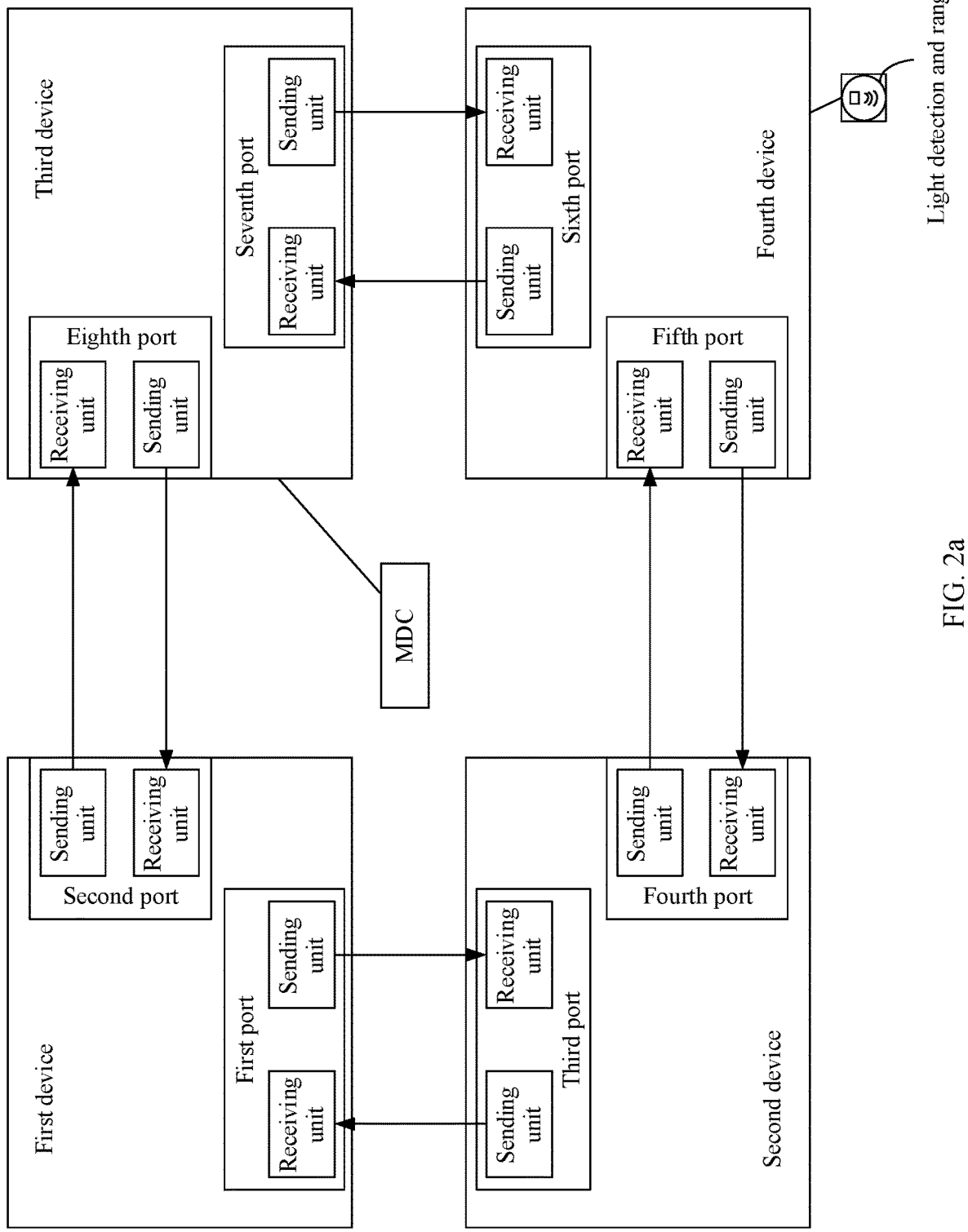
FIG. 2a is a schematic diagram of a system architecture to which an embodiment of this application is applicable.

FIG. 2a is an example of a schematic diagram of a system architecture to which an embodiment of this application is applicable. As shown in FIG. 2a, the system architecture may be a ring network, and the ring network may be an in-vehicle communication ring network based on a regional communication computing gateway architecture. As shown in FIG. 2a, the ring network includes a plurality of devices, for example, a fourth device, a second device, a first device, and a third device shown in FIG. 2a. It should be noted that, in this embodiment of this application, only an example in which the ring network includes four devices is used for illustration. In an actual application, a quantity of devices is not limited. As shown in FIG. 2a, the fourth device, the second device, the first device, and the third device are sequentially interconnected to form a ring network.

As shown in FIG. 2a, the fourth device, the second device, the first device, and the third device may be network forwarding devices (or referred to as gateway devices, regional communication computing gateways, or the like). The network forwarding device may be connected to other devices through an Ethernet interface of a same rate (for example, 1 Gbps, 10 Gbps, or 25 Gbps). Data transmitted by the other devices may be data collected by a sensor, a controller area network (controller area network, CAN) bus data signal, or the like. The sensor may be, for example, a radar (radar), an advanced driver assistance system (advanced driver assistance system, ADAS) camera, or light detection and ranging (light detection and ranging, LIDAR). The other devices in FIG. 2a are illustrated by using the light detection and ranging and a mobile data center/mobile computing center (mobile data center, MDC). In an actual application, other devices (for example, other types of sensors) may be further included. The other devices can be connected to a nearby network forwarding device based on a location of a vehicle body. As shown in FIG. 2a, the light detection and ranging is connected to the fourth device, and the mobile data center/mobile computing center (mobile data center, MDC) is connected to the third device.

Figure 2B:
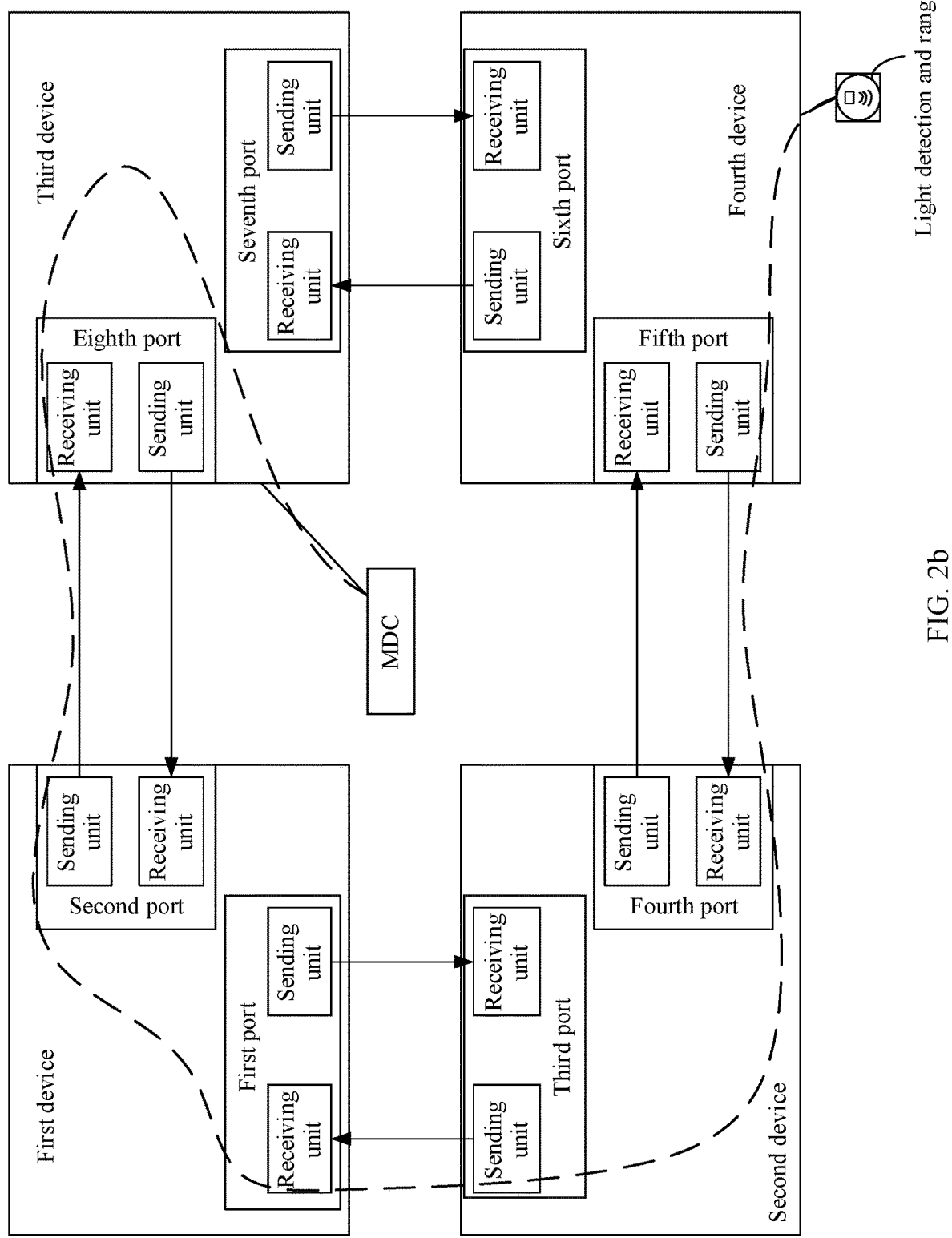

FIG. 2b is an example of a schematic diagram of a data transmission solution in FIG. 2a. An example in which the system architecture shown in FIG. 2a is applied to an in-vehicle ring network is used for description. If no fault occurs on links, a data packet may be transmitted clockwise (clockwise) in the ring network. As shown in FIG. 2b, the light detection and ranging is connected to the fourth device on a left rear side of the vehicle body. A signal collected by the light detection and ranging is data in an Ethernet format, and may be referred to as a data packet. The data packet is transmitted to the second device, and the second device transmits the data packet to the first device based on a default clockwise transmission principle. Then the data packet is transmitted by the first device to the third device and arrives at the MDC. The MDC identifies and determines, based on various obstacle information collected by the light detection and ranging at rear of the vehicle body, whether an obstacle that affects reversing of the vehicle exists behind the vehicle, and determines whether to perform a driving action such as braking or stepping on an accelerator.

It should be noted that there may be three to eight network forwarding devices on the ring network, and four network forwarding devices shown in FIG. 2a and FIG. 2b are merely examples.

As shown in FIG. 2a and FIG. 2b, the fourth device, the second device, the first device, and the third device each may include one or more ports. As shown in FIG. 2a, the fourth device includes a fifth port and a sixth port, and the second device includes a third port and a fourth port, the first device includes a first port and a second port, and the third device includes a seventh port and an eighth port. Each port of each device shown in FIG. 2a includes a sending unit and a receiving unit. The first port of the first device is used as an example for description, and details are not described again. As shown in FIG. 2a, a sending unit of the first port is connected to a receiving unit of the third port in the second device, a receiving unit of the first port is correspondingly connected to a sending unit of the third port in the second device. When the first device sends a message via the first port, the message is sent to a receiving unit of the third port in the second device via the sending unit of the first port. When sending a message via the third port, the second device sends the message to the receiving unit of the first port of the first device via the sending unit of the third port of the second device. In this embodiment of this application, a link corresponding to a receiving unit of a port is the same as a link corresponding to a sending unit of a peer port of the port, and a link corresponding to a sending unit of a port is the same as a link corresponding to a receiving unit of a peer port of the port. For example, in FIG. 2a, a link corresponding to the receiving unit of the first port of the first device is the same as a link corresponding to the sending unit of the third port of the second device, and a link corresponding to a sending unit of the first port of the first device is the same as a link corresponding to a receiving unit of the third port of the second device.

In this embodiment of this application, a link between two ports may be referred to as a bidirectional link. The bidirectional link includes two unidirectional links. For example, a bidirectional link between the first port and the third port includes a unidirectional link for transmission from the first port to the third port and a unidirectional link for transmission from the third port to the first port. As shown in FIG. 2a and FIG. 2b, a bidirectional link between two ports may actually be two physical cables, or may be one physical cable. For example, 1000BASE-T1 automotive-grade Ethernet uses a cable that contains two twisted-pair copper cables for communication. A 1000BASE-T1 interface may use this cable to send and receive data at the same time (in other words, full-duplex, expressed as full-duplex in English). In this case, if a sending unit of the 1000BASE-T1 interface fails and cannot send data, a unidirectional fault occurs. A port in embodiments of this application includes but is not limited to an automotive-grade 1000BASE-T1 (1 Gbps) port or a 10GBASE-T1 (an automotive-grade 10 Gbit interface to be standardized by the IEEE) port.

Before the solutions provided in embodiments of this application are described, related terms mentioned in embodiments of this application are first explained.

(1) Local Fault

In embodiments of this application, a local fault on a port of a device means that the fault occurs on a link corresponding to a receiving unit of the port, or the port is in a local fault status.

(2) Remote Fault

In embodiments of this application, a remote fault on a port of a device means that the fault occurs on a link corresponding to a sending unit of the port, or the port is in a remote fault status.

(3) Non-Fault Status

In embodiments of this application, it may be considered that a link corresponding to a sending unit of a port is in a non-fault status (in other words, no remote fault occurs on the port). Alternatively, a link corresponding to a receiving unit of a port is in a non-fault status (in other words, no local fault occurs on the port). Alternatively, a port is in a non-fault status. In this case, a link corresponding to a sending unit of the port is in the non-fault status, and a link corresponding to a receiving unit of the port is in the non-fault status; alternatively, neither a local fault nor a remote fault occurs on the port, in other words, the port is in a normal operating status.

In embodiments of this application, the term "a plurality of" means two or more than two. "And/or" describes an association relationship between associated objects, and indicates that three relationships may exist. For example, A and/or B may indicate the following three cases: A exists alone, both A and B exist, and B exists alone, where A and B may be singular or plural. The character "/" generally indicates an "or" relationship between the associated objects. At least one of the following items (pieces) or a similar expression thereof refers to any combination of these items, including any combination of singular items (pieces) or plural items (pieces). For example, at least one of a, b, or c may indicate: a, b, c, a-b, a-c, b-c, or a-b-c, where a, b, and c may be singular or plural.

In addition, unless otherwise stated, ordinal numbers such as "first" and "second" in embodiments of this application are used to distinguish between a plurality of objects, and are not used to limit an order, a time sequence, priorities, or importance of the plurality of objects. For example, a first continuity check message, a second continuity check message, a third continuity check message, and a fourth continuity check message are merely used for distinguishing between different continuity check messages, but do not indicate different priorities or importance of the several continuity check messages. For another example, a first data packet, a second data packet, and the like are merely intended to distinguish between different data packets, but do not indicate different priorities or importance of the several data packets.

Figure 3:
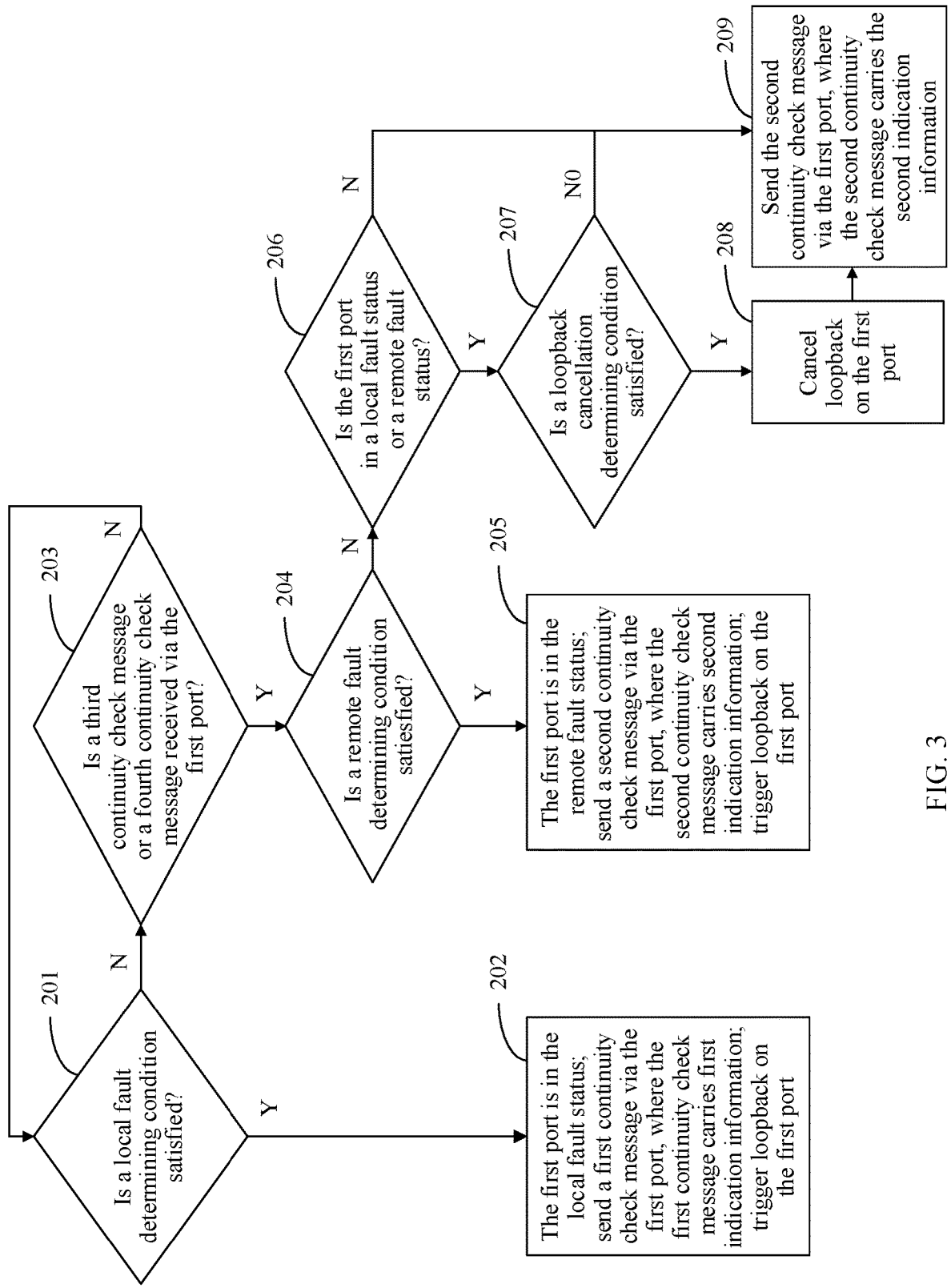
FIG. 3 is a schematic flowchart of a troubleshooting method according to an embodiment of this application.

Based on the foregoing content, FIG. 3 is a schematic flowchart of a troubleshooting method according to an embodiment of this application. In FIG. 3, a first port of a first device is used as an example for description. As shown in FIG. 3, the method includes the following steps.

Step 201: The first device determines whether the first port currently satisfies a local fault determining condition. If the first port satisfies the local fault determining condition, step 202 is performed. If the first port does not satisfy the local fault determining condition, step 203 is performed.

In this embodiment of this application, if the first port satisfies the local fault determining condition, the first port is in a local fault status. In this embodiment of this application, that "the first port is in a local fault status" means that "a link corresponding to a receiving unit of the first port is in a fault status".

In this embodiment of this application, the local fault determining condition corresponding to the first port may include one or more of the following content:

A total quantity of third continuity check packets and fourth continuity check packets received via the first port within preset first duration is not greater than a first quantity; and the link corresponding to the receiving unit of the first port is in a disconnected status.

In the local fault determining condition corresponding to the foregoing first port, both the third continuity check packet and the fourth continuity check packet are sent by a second device to the first port via a third port, the third continuity check packet carries first indication information, and the fourth continuity check packet carries second indication information. The first indication information indicates that a link corresponding to a receiving unit of a port that sends the first indication information is in the fault status. The second indication information indicates that a link corresponding to a receiving unit of a port that sends the second indication information is in a non-fault status. Related content such as sending occasions of the third continuity check packet and the fourth continuity check packet is described in detail in subsequent content.

In the foregoing local fault determining condition corresponding to the first port, the first duration may be preset, for example, may be duration corresponding to a period of a specified quantity (for example, 3.5) of fourth continuity check packets. The first quantity is a value corresponding to the first duration. For example, the fourth continuity check packet in a ring network is periodically sent based on a period of second duration (in other words, a sending period of the fourth continuity check packet is the second duration). Then the value of the first duration may be equal to 3.5 second duration. In this case, the first quantity should be a positive integer less than 3.5. For example, the first quantity is 1. An example of the local fault determining condition corresponding to the first port is that a total quantity of third continuity check packets and fourth continuity check packets received via the first port within 3.5 second duration is not greater than 1.

A second local fault determining condition is that the link corresponding to the receiving unit of the first port is in the disconnected status.

In this embodiment of this application, the first port is used as an example to describe several possible cases of determining the local fault. For another port, the local fault determining condition corresponding to the foregoing first port is adaptively changed. For example, the second device needs to determine whether the local fault occurs on the third port. In this case, the second device may determine whether one or more of the following conditions are met:

A total quantity of first continuity check packets and second continuity check packets received via the third port within the preset first duration is not greater than the first quantity; and a link corresponding to a receiving unit of the third port is in the disconnected status.

In the foregoing local fault determining condition corresponding to the third port, both the first continuity check packet and the second continuity check packet are sent by the first device to the third port via the first port, the first continuity check packet carries first indication information, and the second continuity check packet carries second indication information. The first indication information indicates that the link corresponding to the receiving unit of the port that sends the first indication information is in the fault status. The second indication information indicates that the link corresponding to the receiving unit of the port that sends the second indication information is in the non-fault status. Related content such as sending occasions of the first continuity check packet and the second continuity check packet is described in detail in subsequent content.

Step 202: If the first port of the first device is in the local fault status, the first device sends a first continuity check message to the third port of the second device via the first port. The first continuity check message carries the first indication information. The first indication information indicates that the link corresponding to the receiving unit of the port that sends the first indication information is in the fault status.

In this way, the second device may determine, based on the first indication information in the received first continuity check message, that a fault occurs on the link corresponding to the receiving unit of the first port (namely, a link corresponding to a sending unit of the third port), in other words, a remote fault occurs on the third port.

In step 202, the first device may further trigger loopback on the first port. In other words, a loopback trigger condition includes that the first device finds that the local fault occurs on one port of the first device. For example, that the first port of the first device triggers loopback may: for a first data packet to be sent by a sending unit of the first port, the first device loops back the first data packet to the receiving unit of the first port. Further, optionally, the first device may set a loopback flag for the first data packet on which loopback is performed. In this embodiment of this application, performing loopback on the first port may also be considered as performing wrapping handover on the first port. There are a plurality of nouns, but they all substantially mean: The first device rewrites a packet header field of the first data packet, and then process and forward the first data packet with a rewritten packet header field based on a processing process for data received from the receiving unit of the first port (in other words, the first data packet with the rewritten packet header field is processed and forwarded as the data received from the first port).

When the local fault occurs on the first port, a transmission service may continue to be provided to the first data packet in a loopback mode. That is, an available transmission service can still be provided if a single point of failure occurs on an in-vehicle ring network, to transfer a service data packet to a destination device. Therefore, reliability of data transmission can be improved.

Step 203: The first device determines whether a third continuity check message or a fourth continuity check message is received via the first port. If the third continuity check message or the fourth continuity check message is received via the first port, step 204 is performed. If the third continuity check message or the fourth continuity check message is not received via the first port, step 201 continues to be performed.

Step 204: The first device determines whether the first port satisfies a remote fault determining condition. If the first port satisfies the remote fault determining condition, step 205 is performed. If the first port does not satisfy the remote fault determining condition, step 206 is performed.

In this embodiment of this application, if the first port satisfies the remote fault determining condition, the first port is in a remote fault status. In this embodiment of this application, that "the first port is in a remote fault status" means that "a link corresponding to the sending unit of the first port is in the fault status".

In this embodiment of this application, the remote fault determining condition corresponding to the first port may include: The first indication information is received.

The first indication information indicates that a fault occurs on the link corresponding to the receiving unit of the port that sends the first indication information. Therefore, if the first device receives the first indication information via the first port, it indicates that the fault occurs on the link corresponding to the receiving unit of the third port, where the third port is a peer end of the first port. In addition, the link corresponding to the receiving unit of the third port is the link corresponding to the sending unit of the first port. Therefore, when receiving the first indication information via the first port, the first device may determine that the fault occurs on the link corresponding to the sending unit of the first port, in other words, determine that the first port is in the remote fault status.

Step 205: If the first port of the first device is in the remote fault status, the first device sends a second continuity check message to the third port of the second device via the first port. The second continuity check message does not carry the first indication information. In a possible implementation, the second continuity check message can carry the second indication information. The second indication information indicates that the link corresponding to the receiving unit of the port that sends the second indication information is in the non-fault status.

Step 205 further includes that the first device triggers loopback on the first port. In other words, a loopback trigger condition includes that the remote fault occurs on one port. As for the triggering loopback on the first port by the first device, refer to the description in the foregoing step 202. Details are not described herein again.

When the remote fault occurs on the first port, in other words, when the local fault occurs on the third port of the second device, the first device also triggers loopback. Therefore, this can relieve a problem that transmission of all service data flows cannot be recovered after a unidirectional fault occurs because the remote fault is not determined.

Step 206: The first device determines whether the first port is in the local fault status or the remote fault status. If the first port is in the local fault status or the remote fault status, step 207 is performed. If the first port is not in the local fault status or the remote fault status, step 209 is performed.

In this embodiment of this application, a port status register (which may be written as a port_status register in English) may be maintained for each port of each device on the ring network. The port status register is used for indicating that the port is currently in a local fault status (which may be written as local_rx_fault in English), a remote fault status (which may be written as remote_rx_fault in English), or a normal operating status (which may be written as normal in English). That the port is in a normal operating status means that a link corresponding to a sending unit of the port is in the non-fault status, and a link corresponding to a receiving unit of the port is in the non-fault status.

Optionally, a local fault flag register (which may be written as a ccm_local_rx_fault_flag register in English) may be further maintained for each port of each device. The local fault flag register may indicate whether the port is currently in the local fault status. In an optional implementation, two values may be set for the local fault register, for example, "0" and "1". When the value of the local fault flag register is 0, it indicates that the port is currently not in the local fault status. When the value of the local fault flag register is 1, it indicates that the port is in the local fault status.

In a possible implementation, the first device sends a continuity check message via the first port. The continuity check message includes a preset field. The preset field carries the first indication information or the second indication information. A value of the preset field is a value of the foregoing local fault flag register (which may be written as a ccm_local_rx_fault_flag register in English). In this embodiment of this application, a continuity check message that is sent by the first device via the first port and that carries the first indication information is referred to as the first continuity check message, and a continuity check message that is sent by the first device via the first port and that does not carry the first indication information or carries the second indication information is referred to as the second continuity check message.

In a possible implementation, the first device may periodically send the continuity check message, and may set a timer (which may be written as a send_ccm_timer timer in English). A preset value, for example, the second duration, may be set for the timer. To be specific, the first device is triggered to generate a continuity check message based on a value of a local fault flag register corresponding to the first port (in other words, the value of the local fault flag register is carried in a preset field of the continuity check message) at an interval of the foregoing second duration. The first device sends the continuity check message to the third port of the second device via the first port. When the value of the local fault flag register indicates that the first port is in the local fault status, the continuity check message is the foregoing first continuity check message. When the value of the local fault flag register indicates that the first port is not in the local fault status, the continuity check message is the foregoing second continuity check message.

Optionally, the continuity check message (for example, the foregoing first continuity check message, the foregoing second continuity check message, the foregoing third continuity check message, and the foregoing fourth continuity check message) mentioned in embodiments of this application may be a port-level (or interface-level) message, and may be sent with a specified virtual local area network (Virtual Local Area Network, VLAN) tag. However, the continuity check message is not limited to detecting only continuity in the VLAN, and may also detect interface-level continuity. The continuity check message is terminated hop by hop and is not forwarded then. That is, the first device sends the first continuity check message or the second continuity check message to the third port via the first port, and the second device does not forward the first continuity check message or the second continuity check message after receiving the first connectivity detection message or the second connectivity detection message. In embodiments of this application, a default transmit period (for example, the foregoing second duration) of the continuity check message may be a 300-μs period (a default value), and other transmit period options may be 100 μs, 200 μs, 600 μs, 1 ms, 3.3 ms, and the like.

In step 206, a current status of the first port may be determined based on the port status register and/or the local fault flag register corresponding to the first port.

In this embodiment of this application, in the foregoing step 202, when the first port is in the local fault status, the local fault flag register and the port status register may be accordingly updated. When it is determined that the first port is in the remote fault status in the foregoing step 205, the local fault flag register and the port status register also need to be accordingly updated. There may be a case in which the first port is currently in both the local fault status and the remote fault status, in other words, two links of the first port are both in the fault status. In this case, the value of the local fault flag register needs to be set to a value indicating that the port is in the local fault status. A value of the port status register may be set to a value indicating that the port is in the local fault, or may be set to a value indicating that the port is in the remote fault status. That is, when the port status of the first port switches between the local fault status, the remote fault status, and the normal operating status, the value of the port status register and/or the value of the local fault flag register need/needs to be accordingly updated.

Step 207: The first device determines whether a loopback cancellation determining condition is satisfied. If the condition is satisfied, step 208 and step 209 are performed. If the condition is not satisfied, step 209 is performed.

In this embodiment of this application, a loopback cancellation determining condition corresponding to the first port may include: A preset second quantity of fourth continuity check messages are received via the first port. The fourth continuity check message does not carry the first indication information or carries the second indication information. The second quantity may be preset, for example, may be set to 5.

In a possible implementation, a counter (consecutive_ccm_normal_count) may be set for the first port to count a quantity of fourth continuity check messages received via the first port in the local fault status or the remote fault status.

In step 207, optionally, if the first port is in the local fault status or the remote fault status, when the fourth continuity check message is received, a value of the counter may be increased by 1. Then the first device may determine, based on the value of the counter, whether the quantity of fourth continuity check messages received via the first port is not smaller than the second quantity, and if the quantity is smaller than the second quantity (in other words, loopback cancellation determining condition is not satisfied), step 209 is performed. If the value is not smaller than the second quantity (in other words, loopback cancellation determining condition is satisfied), the counter may be reset to zero, and loopback is canceled for the first port. In other words, in this embodiment of this application, the counter is increased by 1 when the fourth continuity check message is received only if the first port is in the local fault status or the remote fault status. When the first port is in the non-fault status, even if the fourth continuity check message is received, the counter is not increased by 1.

In an optional implementation, if the first port is in the local fault status or the remote fault status, when the third continuity check message is received, the value of the counter may be reset to zero. That is, if the local fault or the remote fault occurs, a received continuity check message may be the third continuity check message, or the fourth continuity check message. When five consecutive (the second quantity is 5) continuity check messages are all fourth continuity check messages, it is determined that loopback cancellation determining condition is satisfied. For example, after it is determined that the first port is in the local fault status, the second device receives two fourth continuity check messages via the first port. In this case, the value of the counter is 2. The first port receives one third continuity check message. In this case, the counter is reset to zero. Then the first port receives three fourth continuity check messages. In this case, the value of the counter is 3. When subsequent two continuity check messages are still the fourth continuity check message, it is determined that the first port satisfies loopback cancellation determining condition. In this case, loopback is canceled on the first port.

In another optional implementation, if the first port is in the local fault status or the remote fault status, the counter is not reset to zero when the third continuity check message is received. For example, after it is determined that the first port is in the local fault status, the second device receives two fourth continuity check messages via the first port. In this case, the value of the counter is 2. The first port receives one third continuity check message. In this case, the first port is in the remote fault status, but the counter is not reset to zero. Then the first port receives three fourth continuity check messages. In this case, the value of the counter is 5. It is determined that the first port satisfies loopback cancellation determining condition, and loopback is canceled on the first port.

Step 208: The first device cancels loopback on the first port.

After the first device cancels loopback on the first port in step 208, for a first data packet to be sent by the sending unit of the first port, the first device sends the first data packet to the third port of the second device via the sending unit of the first port.

In this embodiment of this application, neither the first continuity check message nor the second continuity check message belongs to the first data packet. When loopback is performed on the first port, the first data packet to be sent via the first port is looped back to the receiving unit of the first port. The first continuity check message and/or the second continuity check message that are to be sent via the first port are/is sent to the third port of the second device via the sending unit of the first port, and are/is not looped back to the receiving unit of the first port.

In this embodiment of this application, the first data packet is a packet other than the foregoing first continuity check message and the foregoing second continuity check message in packets to be sent by the first device via the first port.

In step 208, the first device may cancel loopback on the first port. Certainly, the first device may also report loopback to a control plane processor and software (for example, device control software) of the first device, and an upper-layer device control software or a network administrator of the first device determines whether to cancel loopback, or delay canceling loopback. If the upper-layer device control software determines to delay canceling loopback, for example, set a timer and specify a time period, for example, one minute. In this way, the first device may cancel loopback on the first port after one minute. This can mitigate fault caused by frequent link interruption and recovery in a short time period after loopback is canceled.

Step 209: The first device sends the second continuity check message to the third port of the second device via the first port, where the second continuity check message does not carry the first indication information, and may carry the second indication information.

In this embodiment of this application, a loopback cancellation determining condition corresponding to the third port may include: A preset second quantity of second continuity check messages are received via the third port. The second continuity check message does not carry the first indication information or carries the second indication information. The second quantity may be the same parameter as the second quantity in the previous loopback cancellation determining condition corresponding to the first port. Details are not described herein again.

In a possible implementation, a counter (consecutive_ccm_normal_count) may be set for the third port to count a quantity of second continuity check messages received via the third port in the local fault status or the remote fault status.

Optionally, if the third port is in the local fault or the remote fault, when the second continuity check message is received, the value of the counter may be increased by 1. Then the first device may determine, based on the value of the counter, whether a quantity of second continuity check messages received via the third port is not smaller than the second quantity. If the quantity is smaller than the second quantity (in other words, loopback cancellation determining condition is not satisfied), loopback is not canceled. If the value is not smaller than the second quantity (in other words, loopback cancellation determining condition is satisfied), the counter may be reset to zero, and loopback is canceled for the third port. In other words, in this embodiment of this application, the counter is increased by 1 when the second continuity check message is received only if the third port is in the local fault status or the remote fault status. When the third port is in the non-fault status, even if the second continuity check message is received, the counter is not increased by 1.

In an optional implementation, if the third port is in the local fault status or the remote fault status, when the third continuity check message is received, the value of the counter may be reset to zero. That is, if the local fault or the remote fault occurs, a received continuity check message may be the third continuity check message, or the second continuity check message. When five consecutive (the second quantity is 5) continuity check messages are all second continuity check messages, it is determined that loopback cancellation determining condition is satisfied. For example, after it is determined that the third port is in the local fault status, the second device receives two second continuity check messages via the third port. In this case, the value of the counter is 2. The third port receives one third continuity check message. In this case, the value of the counter is reset to zero. Then the first port receives three second continuity check messages. In this case, the value of the counter is 3. When subsequent two continuity check messages are still the second continuity check message, it is determined that the third port satisfies loopback cancellation determining condition. In this case, loopback is canceled on the third port.

It is determined that the third port satisfies loopback cancellation determining condition, and loopback is canceled on the third port.

The foregoing content describes the troubleshooting method in this embodiment of this application via the first port of the first device as an example. It can be learned from the foregoing content that, in this embodiment of this application, a loopback trigger condition on the first port of the first device includes: The local fault and/or the remote fault occurs on the first port.

Based on the example provided in FIG. 3, the following Table 1 lists, in a form of a table, trigger conditions and execution actions corresponding to port status switching of the first port of the first device. A first row in Table 1 is used as an example. An original port status of the first port of the first device is a normal operating status, and the first port switches to a remote fault status. A trigger condition is: The first device receives the first indication information on the first port (in the foregoing example, the first indication information is carried in the third continuity detection packet). An execution action of the first device is: setting port_status register to remote_rx_fault status, performing loopback on the first port, and sending the second continuity detection packet. Other content in Table 1 is not described again. Refer to the table and related content in the foregoing FIG. 3.

TABLE 1

Trigger conditions and execution actions corresponding to status switching of a first port of a first device

| Original status | Destination status | Trigger condition | Execution action | | | |
|---|---|---|---|---|---|---|
| Normal operating status | Remote fault | First indication information is received on the first port | Set ccm_local_rx_fault_flag to 0 | Set port_status register to remote_rx_fault status | Perform loopback on the first port | Send a second continuity detection packet |
| Local fault | | | | | | |
| Normal operating status | Local fault | A total quantity of third continuity check messages and fourth continuity check messages received within 3.5 second duration is not greater than 1 | Set ccm_local_rx_fault_flag to 1 | Set port_status register to local_rx_fault status | Perform loopback on the first port | Send first continuity detection packet |
| Remote fault | | | | | | |
| Local fault | Normal operating status | Five fourth continuity check messages are received | Set ccm_local_rx_fault_flag to 0 | Set port_status register to normal operating status | Cancel loopback | Send the second continuity detection packet |
| Remote fault | | | | | | |

In another optional implementation, if the third port is in the local fault status or the remote fault status, the counter is not reset to zero when the third continuity check message is received. For example, after it is determined that the third port is in the local fault status, the second device receives two second continuity check messages via the third port. In this case, the value of the counter is 2. The third port receives one third continuity check message. In this case, the third port is in the remote fault status, but the counter is not reset to zero. Then the first port receives three second continuity check messages. In this case, the value of the counter is 5.

It should be noted that, when the first port of the first device switches from the normal operating status to the local fault status or the remote fault status, the first device needs to trigger loopback on the first port. When the first port of the first device switches from the local fault status to the remote fault status, or switches from the remote fault status to the local fault status, because the first port of the first device originally performs loopback in the original status, after switching to the destination status, the first port of the first device only needs to maintain loopback.

On the other hand, after the first port of the foregoing first device switches from the normal operating status or the local fault status to the remote fault status, the first continuity detection packet is sent in a plurality of manners. In a possible implementation, after the first port of the first device switches from the normal operating status or the local fault status to the remote fault status, one or more (for example, three) first continuity detection packets may be sent immediately and continuously, and then the first continuity detection packet may be sent periodically based on a period of the foregoing second duration. In another possible implementation, after switching from the normal operating status or the local fault status to the remote fault status, the first port of the first device periodically sends the first continuity detection packet based on a period of the foregoing second duration.

It can be learned from the solution provided in the foregoing FIG. 3 that, in this embodiment of this application, in a first aspect, the first device can determine, based on the third continuity check message received from the first port, that the remote fault occurs on the first port, and trigger loopback when the remote fault occurs on the first port. Therefore, this can relieve the problem that transmission of all service data flows cannot be recovered after the unidirectional fault occurs because the first device cannot determine the remote fault.

In a second aspect, if the local fault occurs, the first device may send the first continuity check message that carries the first indication information to the second device. In this case, the second device can determine that the remote fault occurs on the third port, and trigger loopback. Therefore, this can relieve the problem that transmission of all service data flows cannot be recovered after the unidirectional fault occurs because the second device cannot determine the remote fault.

In a third aspect, if the local fault occurs on the first port, the first device may trigger loopback on the first port, in other words, the transmission service may continue to be provided to the first data packet in loopback mode. That is, the available transmission service can still be provided if the single point of failure occurs on the in-vehicle ring network, to transfer the service data packet to v destination device. Therefore, the reliability of the data transmission can be improved.

FIG. 4 is an example of schematic diagram of a continuity check packet to which an embodiment of this application is applicable. A preset field may be a "com_local_rx_fault_flag" field in FIG. 4, and carries a value of a ccm_local_rx_fault_flag register. As shown in FIG. 4, a continuity check message (for example, the foregoing first continuity check message, the foregoing second continuity check message, the foregoing third continuity check message, and the foregoing fourth continuity check message) in this embodiment of this application may continue to use some fields in a format of a continuity check message in the IEEE 802.1Q-2018 standard. The continuity check message shown in FIG. 4 to which this embodiment of this application is applied simplifies and omits fields that are not required in an in-vehicle ring network scenario. A source MAC address (MAC source) in the continuity check message may be a MAC address of a device (for example, a source MAC address in the first continuity check message sent by a first device may be a MAC address of the first device). A destination MAC address (MAC destination) may be a multicast address 01-80-C2-00-00-30.

It can be learned that this embodiment of this application can support an Ethernet standard frame format and an 802.1cb frame format, and a high-reliability transmission mechanism based on dual fed and selective receiving in 802.1cb or wrapping handover in an in-vehicle network, without separately defining two sets of frame formats and selecting one frame format for deployment in the in-vehicle network. In addition, in this embodiment of this application, service bandwidth occupied by the continuity check message is not significantly increased, and a complex CCM response mechanism is not clearly introduced. In addition, this embodiment of this application can support an existing loopback solution, easily implement a chip extension, and has low implementation complexity. In this embodiment of this application, it can be ensured that a service interruption time period is measured in 1 ms, and a service switching time period is not significantly increased.

Figure 5A:
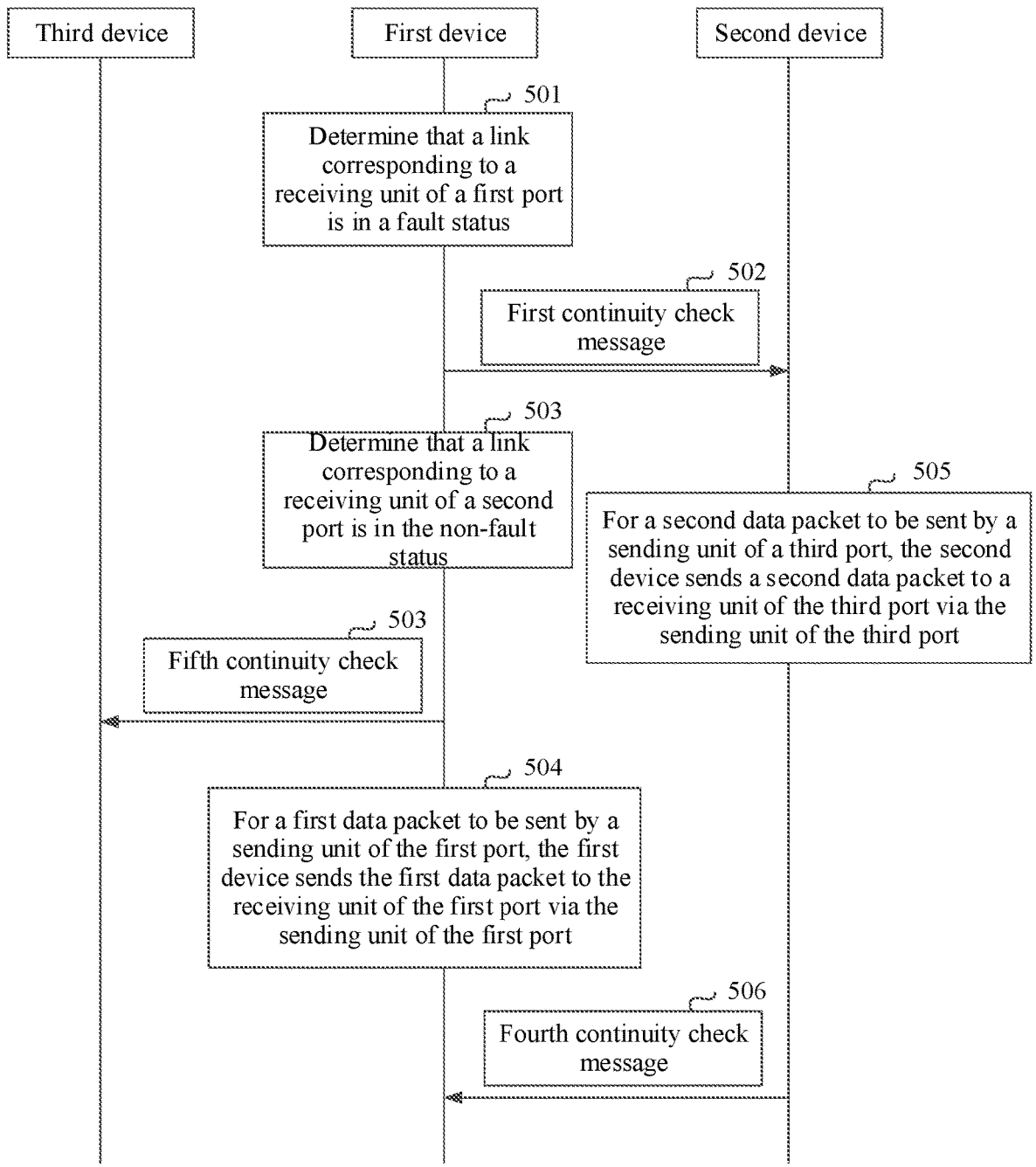
FIG. 5a is a schematic flowchart of another troubleshooting method according to an embodiment of this application.

FIG. 5a is an example of a schematic flowchart of another troubleshooting method. The solution is illustrated by using the system architecture shown in the foregoing FIG. 2b as an example. As shown in FIG. 5a, the method includes the following steps.

Step 501: The first device determines that the link corresponding to the receiving unit of the first port is in the fault status.

In step 501, if either of the following conditions is satisfied, the first device determines that the link corresponding to the receiving unit of the first port is in the fault status.

A total quantity of third continuity check packets and fourth continuity check packets received via the first port within preset first duration is not greater than a first quantity; and the link corresponding to the receiving unit of the first port is in a disconnected status. For description herein, refer to the related content in the foregoing FIG. 3. Details are not described herein again.

Step 502: The first device sends the first continuity check message to the second device via the first port. The first continuity check message carries first indication information. The first indication information indicates that a link corresponding to a receiving unit of a port that sends the first indication information is in the fault status.

Correspondingly, the second device receives the first continuity check message from the first port of the first device via the third port.

Step 503: The first device determines that a link corresponding to a receiving unit of the second port is in the non-fault status; the first device sends a fifth continuity check message to the third device via the second port. The fifth continuity check message carries second indication information. The second indication information indicates that a link corresponding to a receiving unit of a port that sends the second indication information is in the non-fault status.

Correspondingly, the third device receives the fifth continuity check message.

There is no specific sequence relationship between the foregoing step 502 and the foregoing step 503. Step 503 may be performed before step 502.

Step 504: For a first data packet to be sent by the sending unit of the first port, the first device sends the first data packet to the receiving unit of the first port via the sending unit of the first port.

Step 505: For a second data packet to be sent by the sending unit of the third port, the second device sends the second data packet to the receiving unit of the third port via the sending unit of the third port.

In this embodiment of this application, neither the third continuity check message nor the fourth continuity check message belongs to the second data packet. When loopback is performed on the third port, the second data packet to be sent via the third port is looped back to the receiving unit of the third port. The third continuity check message and/or the fourth continuity check message that are to be sent via the third port are/is sent to the first port of the first device via the sending unit of the third port, and are/is not looped back to the receiving unit of the third port.

In this embodiment of this application, the second data packet is a packet other than the foregoing third continuity check message and the foregoing fourth continuity check message in packets to be sent by the second device via the third port.

Step 506: The second device sends the fourth continuity check message to the first port of the first device via the third port. The fourth continuity check message carries the second indication information. The second indication information indicates that the link corresponding to the receiving unit of the port that sends the second indication information is in the non-fault status.

As shown in FIG. 5a, when a local fault occurs on the first device, the first device notifies the second device by sending the first indication information, so that the second device can determine that a remote fault occurs on the third port, and then perform loopback. This can prevent the problem that transmission of all service data flows cannot be recovered after the unidirectional fault occurs because the remote fault is not determined.

Figure 5B:
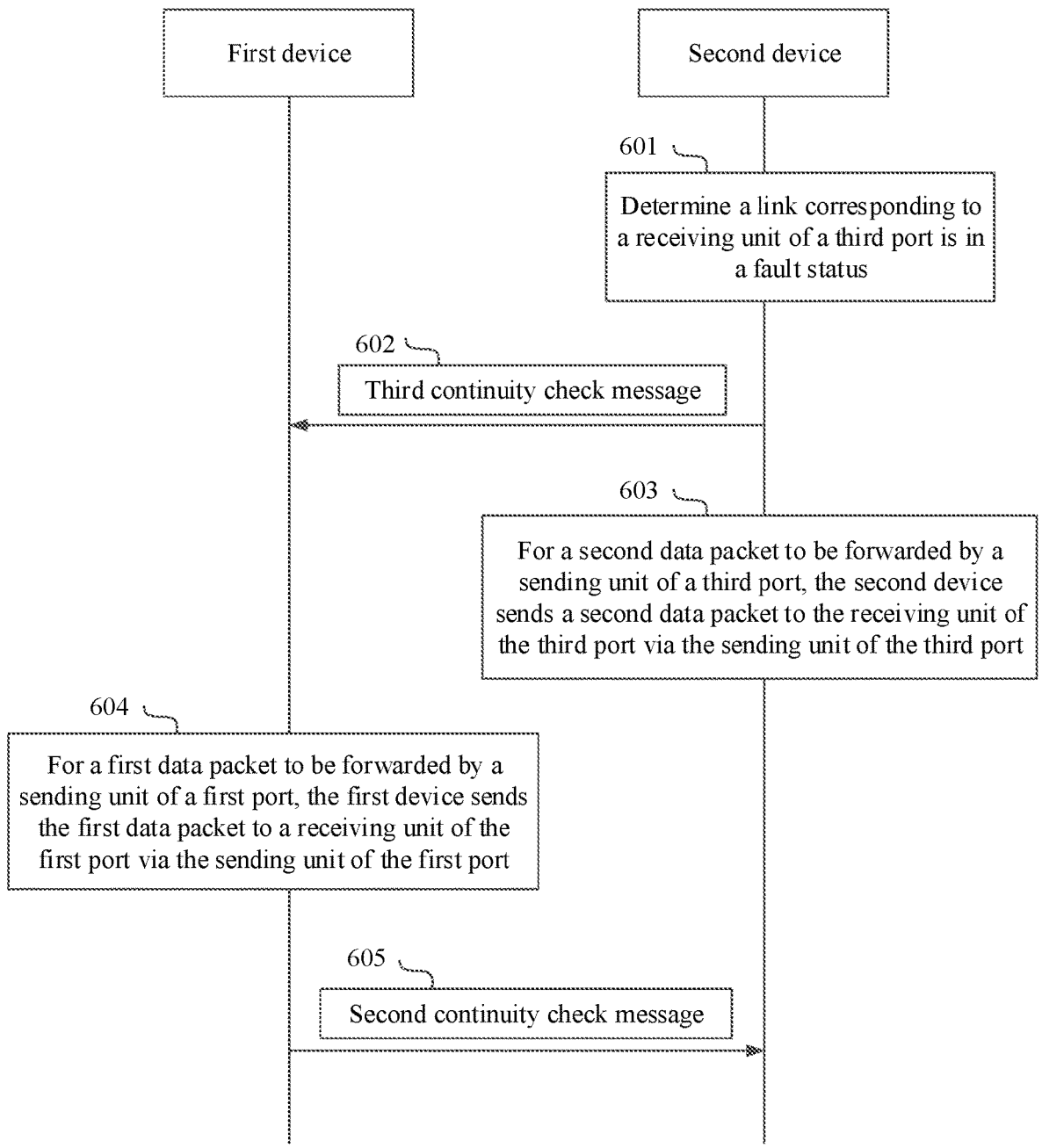
FIG. 5b is a schematic flowchart of another troubleshooting method according to an embodiment of this application.

FIG. 5b is an example of a schematic flowchart of another troubleshooting method. The solution is illustrated by using the system architecture shown in the foregoing FIG. 2b as an example. As shown in FIG. 5b, the method includes the following steps.

Step 601: The second device determines that the link corresponding to the receiving unit of the third port is in the fault status.

In step 601, that the second device determines that the link corresponding to the receiving unit of the third port is in the fault status includes:

If either of the following conditions is satisfied, the second device determines that the link corresponding to the receiving unit of the third port is in the fault status, a total quantity of first continuity check packets and second continuity check packets received via the third port within the preset first duration is not greater than the first quantity; and the link corresponding to the receiving unit of the third port is in the disconnected status.

Step 602: The second device sends a third continuity check message to the first device via the third port. The third continuity check message carries first indication information. The first indication information indicates that a link corresponding to a receiving unit of a port that sends the first indication information is in the fault status.

Correspondingly, the first device receives the third continuity check message.

Step 603: For the second data packet to be forwarded by the sending unit of the third port, the second device sends the second data packet to the receiving unit of the third port via the sending unit of the third port.

Step 604: For the first data packet to be forwarded by the sending unit of the first port, the first device sends the first data packet to the receiving unit of the first port via the sending unit of the first port.

Step 605: The first device sends the second continuity check message to the second device via the first port. The second continuity check message carries the second indication information. The second indication information indicates that the link corresponding to the receiving unit of the port that sends the second indication information is in the non-fault status.

As shown in FIG. 5b, when the local fault occurs on the second device, the second device notifies the first device by sending the first indication information, so that the first device can determine that a remote fault occurs on the third port, and then perform loopback. This can prevent the problem that transmission of all service data cannot be recovered because the remote fault is not determined.

In an optional implementation, after the first device determines that the link corresponding to the receiving unit of the first port is in the fault status, the following is also included: If the first device receives a second quantity of fourth continuity check messages via the first port, the first device sends the second continuity check message to the second device via the first port; for the first data packet to be sent by the sending unit of the first port, the first device sends the first data packet to the second device via the first port.

In another optional implementation, after the second device receives the first continuity check message from the first port of the first device via the third port, the following is also included: If the second device receives a second quantity of second continuity check messages via the third port, the second device sends the fourth continuity check message to the first device via the third port; for the second data packet that to be sent by the sending unit of the third port, the second device sends the second data packet to the first device via the third port.

Figure 6:
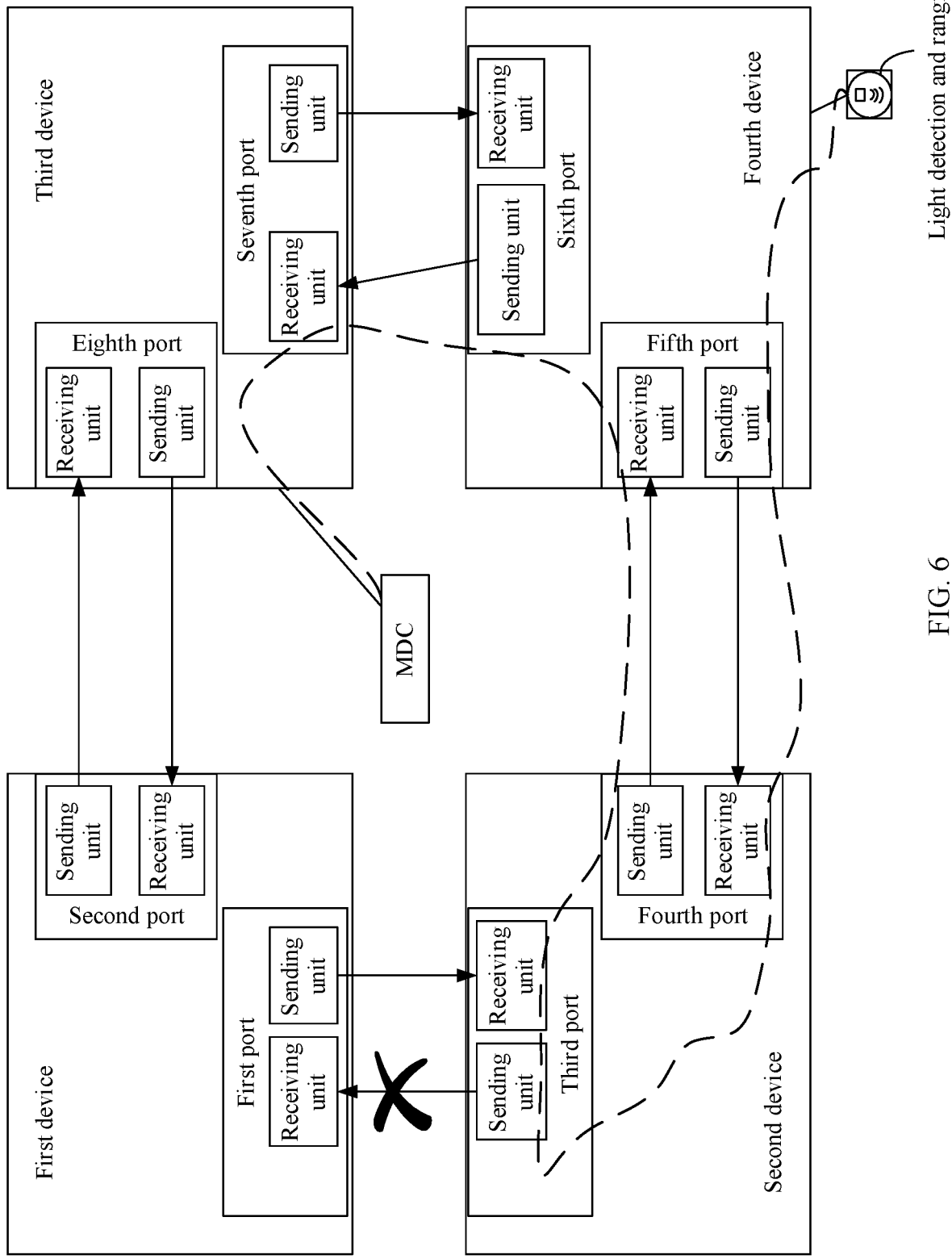
FIG. 6 is a possible application scenario of a system architecture shown in FIG. 2b.

FIG. 6 is an example of a possible application scenario of a system architecture shown in FIG. 2b. As shown in FIG. 6, the fault occurs on the link corresponding to the sending unit of the third port of the second device. The following describes the solution in this embodiment of this application based on the system architecture shown in FIG. 6.

In a first step, when links of the first device, the second device, the third device, and the fourth device on the ring network are all in the non-fault status, data may be transmitted clockwise by default on the ring network. For example, as shown in the foregoing FIG. 2b, the data packet collected by the light detection and ranging is sent to the MDC via the fourth device, the second device, the first device, and the third device sequentially. For each port of each of the first device, the second device, the third device, and the fourth device on the ring network, the device periodically sends a continuity check message on the port based on a 300 μs period. The continuity check message carries a value of ccm_local_rx_fault_flag register corresponding to the port. When a link corresponding to a receiving unit of the port is in the fault status, the value of ccm_local_rx_fault_flag register is 1. When the link corresponding to the receiving unit of the port is in the non-fault status, the value of ccm_local_rx_fault_flag register is 0.

In a second step, as shown in FIG. 6, if the first device detects that the fault occurs on the link corresponding to the receiving unit of the first port, the first port of the first device triggers loopback. A value of port_status register corresponding to the first port of the first device is updated to local_rx_fault status, and a value of ccm_local_rx_fault_flag register corresponding to the first port of the first device is updated to 1. In addition, three continuity check messages are sent immediately and continuously via the first port without an interval. The value of ccm_local_rx_fault_flag register carried in the three continuity check messages is 1. Then the continuity check message is periodically sent based on the 300 μs period. The continuity check message carries a value "1" of current ccm_local_rx_fault_flag register corresponding to the first port.

In a third step, the second device receives the continuity check message via the third port, detects that the value of ccm_local_rx_fault_flag register carried in the continuity check message is "1", and then the third port of the second device updates the value of port_status register corresponding to the third port to remote_rx_fault status, and the second device triggers loopback on the third port. The continuity check message is continuously sent via the third port. The continuity check message carries a value "0" of current ccm_local_rx_fault_flag register corresponding to the third port. In this case, data sent by the light detection and ranging is sent to the third port of the second device via the fourth device. After arriving at the sending unit of the third port, the data is looped back to the receiving unit of the third port, and then the data packet collected by the light detection and ranging is forwarded based on a processing process for a data packet received from the receiving unit of the third port. Specifically, the data packet of the light detection and ranging is transmitted to the fourth device via the fourth port of the second device, is transmitted by the fourth device to the third device, and is transmitted by the third device to the MDC.

In a fourth step, if the first device receives five continuity check messages from the link corresponding to the receiving unit of the first port, and the five continuity check messages all carry the value "0" of ccm_local_rx_fault_flag register, the first device cancels loopback on the first port. A value of port_status register corresponding to the first port of the first device is updated to normal operating status, and the value of ccm_local_rx_fault_flag register corresponding to the first port of the first device is updated to 0. In addition, a continuity check message is periodically sent based on the 300 µs period. The continuity check message carries a value "0" of current ccm_local_rx_fault_flag register corresponding to the first port.

In a fifth step, if the second device receives five continuity check messages from the link corresponding to the receiving unit of the third port, and the five continuity check messages all carry the value "0" of ccm_local_rx_fault_flag register, the second device cancels loopback on the third port. A value of port_status register corresponding to the third port of the second device is updated to normal operating status, and a value of ccm_local_rx_fault_flag register corresponding to the third port of the second device remains 0. In addition, a continuity check message is periodically sent based on the 300 µs period. The continuity check message carries a value "0" of current ccm_local_rx_fault_flag register corresponding to the third port.

In a possible implementation, as shown in FIG. 2b, the first device is connected to the second device via the first port, and is connected to the third device via the second port. The first device sends the continuity check message to the second device via the first port, and sends the continuity check message to the third device via the second port. For each port, if the local fault occurs on the port, a continuity check message sent via the port carries the first indication information; if no local fault occurs on the port, a continuity check message sent via the port does not carry the first indication information, and optionally, may carry the second indication information. As shown in FIG. 6, if the fault occurs on the link corresponding to the receiving unit of the first port of the first device, a continuity check message sent by the first device via the first port carries the first indication information, but a continuity check message sent by the first device via the second port does not carry the first indication information. That is, when one device has a plurality of ports, not all continuity check messages sent by the ports are the same. The device determines, based on whether the local fault occurs on each port, a continuity check message sent via each port carries the first indication information. If the fault occurs on only the link corresponding to the receiving unit of the first port of the first device, the continuity check message sent via the first port carries the first indication information, but the continuity check message sent via the second port does not carry the first indication information. Therefore, the second device may determine that a remote fault occurs on the third port, and the third device may determine that no remote fault occurs on an eighth port.

It should be noted that names of the foregoing messages (the first continuity check message, the second continuity check message, the third continuity check message, and the fourth continuity check message) are merely examples. With evolution of communication technologies, any foregoing message may change its name, but regardless of how the name changes, provided that the meaning of the message is the same as that of the foregoing message in this application, the message falls within the protection scope of this application.

The solutions provided in this application are described above mainly from a perspective of interaction between network elements. It may be understood that, to implement the foregoing functions, each network element includes a corresponding hardware structure and/or software module for implementing each function. A person of ordinary skill in the art should easily be aware that, in combination with the examples described in embodiments disclosed in this specification, units, algorithms and steps may be implemented by hardware or a combination of hardware and computer software in the present invention. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present invention.

Figure 7:
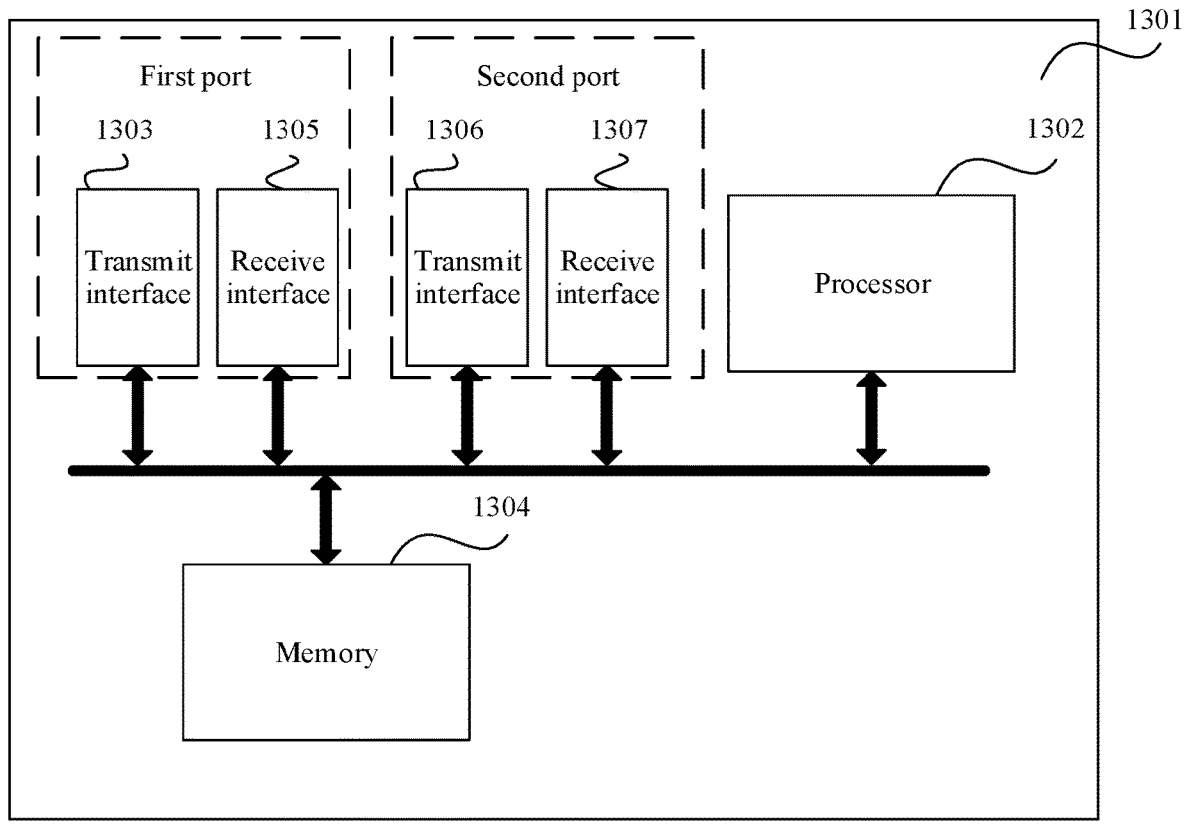
FIG. 7 is a schematic diagram of a structure of a communication device according to an embodiment of this application.

According to the foregoing method, FIG. 7 is a schematic diagram of a structure of a communication device according to an embodiment of this application. As shown in FIG. 7, the communication device may be the foregoing first device, and is configured to perform a method procedure performed by the foregoing first device. The communication device may be a network device, for example, a gateway device, or may be a chip or a circuit, for example, a chip or a circuit that can be disposed in the network device. For example, the communication device provided in this embodiment of this application may be implemented on an application specific integrated circuit (application specific integrated circuit, ASIC) or a field programmable gate array (field programmable gate array, FPGA) of a gateway/forwarding device.

Further, the communication device 1301 may include a plurality of communication interfaces, for example, a transmit interface 1303 and a receive interface 1305 of a first port shown in FIG. 7, and a transmit interface 1306 and a receive interface 1307 of a second port shown in FIG. 7.

The communication device 1301 may further include a bus system. A processor 1302, a memory 1304, the transmit interface 1303, the receive interface 1305, the transmit interface 1306, and the receive interface 1307 may be connected via the bus system.

In an optional implementation, the processor 1302 is configured to determine that a link corresponding to the receive interface 1305 of the first port is in a fault status; the transmit interface 1303 of the first port is configured to send a first continuity check message to the second device. The first continuity check message carries first indication information. The first indication information indicates that a link corresponding to a receiving unit of a port that sends the first indication information is in the fault status.

In an optional implementation, the processor 1302 is further configured to: for a first data packet to be sent by the transmit interface 1303 of the first port, send the first data packet to the receive interface 1305 of the first port via the transmit interface 1303 of the first port.

In an optional implementation, the first device further includes the second port, the first device is connected to the second device via the first port, and the first device is connected to a third device via the second port; the processor 1302 is further configured to: determine that a link corresponding to a receiving unit of the second port is in a non-fault status; the transmit interface 1306 of the second port is configured to: send a fifth continuity check message to the third device. The fifth continuity check message carries second indication information. The second indication information indicates that a link corresponding to a receiving unit of a port that sends the second indication information is in the non-fault status.

In an optional implementation, the receive interface 1305 of the first port is configured to: receive a third continuity check message, where the third continuity check message carries the first indication information. In this case, the transmit interface 1303 of the first port is further configured to: for the first data packet to be forwarded by the transmit interface 1303 of the first port, send the first data packet to the receive interface 1305 of the first port; and send a second continuity check message to the second device via the transmit interface 1303 of the first port, where the second continuity check message carries second indication information, and the second indication information indicates that the link corresponding to the receiving unit of the port that sends the second indication information is in the non-fault status.

In an optional implementation, if the processor 1302 determines that a total quantity of third continuity check packets and fourth continuity check packets received via the first port within preset first duration is not greater than a first quantity, and/or a link corresponding to the receive interface 1305 of the first port is in a disconnected status, it is determined that a link corresponding to the receiving unit of the first port is in the fault status.

In an optional implementation, the receive interface 1305 of the first port is further configured to: receive a second quantity of fourth continuity check messages, where the fourth continuity check message carries the second indication information, and the second indication information indicates that the link corresponding to the receiving unit of the port that sends the second indication information is in the non-fault status. In this case, the transmit interface 1303 of the first port is further configured to: send the second continuity check message to the second device via the sending unit of the first port, where the second continuity check message carries the second indication information, and the second indication information indicates that the link corresponding to the receiving unit of the port that sends the second indication information is in the non-fault status.

In an optional implementation, the transmit interface 1303 of the first port is configured to: for a first data packet to be sent by the transmit interface 1303 of the first port, send the first data packet to the second device.

Figure 8:
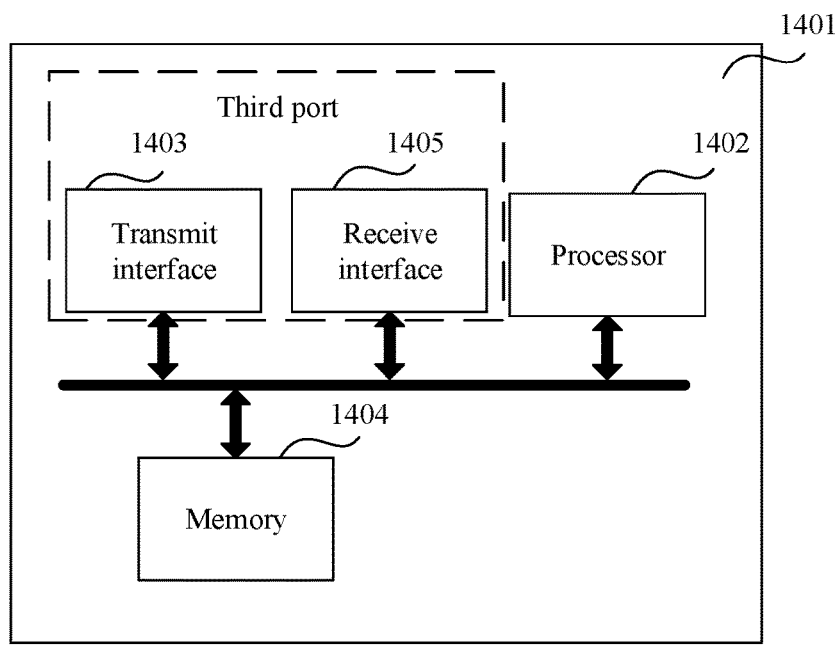
FIG. 8 is a schematic diagram of a structure of another communication device according to an embodiment of this application.

According to the foregoing method, FIG. 8 is a schematic diagram of a structure of a communication device according to an embodiment of this application. As shown in FIG. 8, the communication device may be the foregoing second device, and is configured to perform a method procedure performed by the foregoing second device. The communication device may be a network device, for example, a gateway device, or may be a chip or a circuit, for example, a chip or a circuit that can be disposed in the network device. For example, the communication device provided in this embodiment of this application may be implemented on an application specific integrated circuit (application specific integrated circuit, ASIC) or a field programmable gate array (field programmable gate array, FPGA) of a gateway/forwarding device.

Further, the communication device 1401 may include a plurality of communication interfaces, for example, a transmit interface 1403 of a third port and a receive interface 1405 of the third port shown in FIG. 8.

The communication device 1401 may further include a bus system. A processor 1402, a memory 1404, the transmit interface 1403, and the receive interface 1405 may be connected via the bus system.

In an optional implementation, the receive interface 1405 of the third port is configured to receive a first continuity check message from a first port of a first device. The first continuity check message carries first indication information. The first indication information indicates that a link corresponding to a receiving unit of a port that sends the first indication information is in a fault status.

The processor 1402 is configured to: for a second data packet to be sent by the transmit interface 1403 of the third port, send the second data packet to the receive interface 1405 of the third port via the transmit interface 1403 of the third port.

In an optional implementation, the transmit interface 1403 of the third port is further configured to: send a fourth continuity check message to the first port of the first device. The fourth continuity check message carries second indication information. The second indication information indicates that a link corresponding to a receiving unit of a port that sends the second indication information is in a non-fault status.

In an optional implementation, the processor 1402 is configured to determine that a link corresponding to the receive interface 1405 of the third port is in the fault status; the transmit interface 1403 of the third port is further configured to send a third continuity check message to the first device. The third continuity check message carries the first indication information. The first indication information indicates that the link corresponding to the receiving unit of the port that sends the first indication information is in the fault status.

In an optional implementation, the processor 1402 is further configured to: for the second data packet to be forwarded by the transmit interface 1403 of the third port, send the second data packet to the receive interface 1405 of the third port via the transmit interface 1403 of the third port.

In an optional implementation, if the processor 1402 determines that a total quantity of first continuity check packets and second continuity check packets received via the receive interface 1405 of the third port within preset first duration is not greater than a first quantity, and/or the link corresponding to the receive interface 1405 of the third port is in a disconnected status, it is determined that the link corresponding to the receive interface 1405 of the third port is in the fault status.

In an optional implementation, the receive interface 1405 of the third port is further configured to: receive a second quantity of second continuity check messages, where the second continuity check message carries the second indication information, and the second indication information indicates that the link corresponding to the receiving unit of the port that sends the second indication information is in the non-fault status; then the transmit interface 1403 of the third port is further configured to: send the fourth continuity check message to the first device, where the fourth continuity check message carries the second indication information, and the second indication information indicates that the link corresponding to the receiving unit of the port that sends the second indication information is in the non-fault status.

In an optional implementation, the transmit interface 1403 of the third port is further configured to: for the second data packet to be sent by the transmit interface 1403 of the third port, send the second data packet to the first device.

It should be understood that each of the foregoing processor 1302 and the foregoing processor 1402 may be one chip. For example, the processor may be a field programmable gate array (field programmable gate array, FPGA), an application-specific integrated circuit (application-specific integrated circuit, ASIC), a system-on-a-chip (system-on-a-chip, SoC), a central processing unit (central processor unit, CPU), a network processor (network processor, NP), a digital signal processing circuit (digital signal processor, DSP), a micro controller unit (micro controller unit, MCU), a programmable logic device (programmable logic device, PLD), or another integrated chip.

For each of the foregoing processor 1302 and the foregoing processor 1402, in an implementation process, the steps in the foregoing method may be completed by using a hardware integrated logic circuit or an instruction in a form of software in the processor. The steps of the method disclosed with reference to embodiments of this application may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor.

For each of the foregoing memory 1304 and the foregoing memory 1404, it may be understood that the memory in embodiments of this application may be a volatile memory or a nonvolatile memory, or may include a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus dynamic random access memory (direct rambus RAM, DR RAM). It should be noted that the memory of the systems and methods described in this specification includes but is not limited to these and any memory of another proper type.

For concepts, explanations, detailed descriptions, and other steps of the communication device that are related to the technical solutions provided in embodiments of this application, refer to the descriptions of the content in the foregoing method or other embodiments. Details are not described herein again.

In this embodiment of this application, a transceiver may implement the solution implemented by the foregoing communication interface. For example, the foregoing transmit interface may be implemented by a transmitter, and the receive interface may be implemented by a receiver. For specific method steps, refer to the foregoing content. Details are not described herein again.

Figure 9:
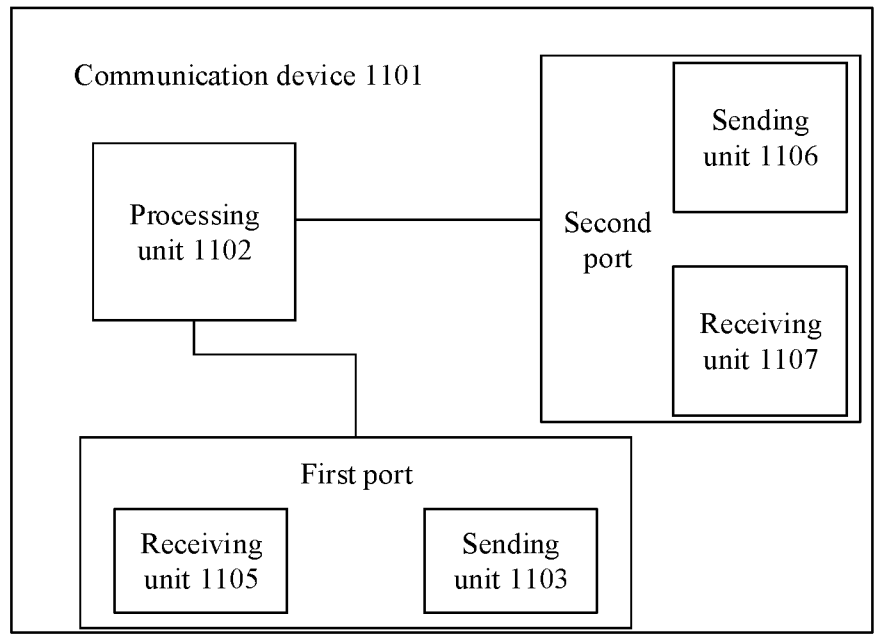
FIG. 9 is a schematic diagram of a structure of another communication device according to an embodiment of this application.

Based on the foregoing embodiments and the same concept, FIG. 9 is a schematic diagram of a communication device according to an embodiment of this application. As shown in FIG. 9, the communication device 1101 may be a network device, or a chip or a circuit, such as a chip or a circuit that can be disposed on a network device.

If the communication device 1101 corresponds to the first device in the foregoing method, the communication device may include a processing unit 1102, a receiving unit 1105 of a first port, a sending unit 1103 of the first port, a sending unit 1106 of a second port, and a receiving unit 1107 of the second port. The processing unit 1102 is configured to determine that a link corresponding to the receiving unit 1105 of the first port is in a fault status; the sending unit 1103 of the first port is configured to send a first continuity check message to the second device. The first continuity check message carries first indication information. The first indication information indicates that a link corresponding to a receiving unit of a port that sends the first indication information is in the fault status.

It should be understood that division into the foregoing units of the communication device is merely logical function division. During actual implementation, all or a part of the units may be integrated into one physical entity, or may be physically separated. In this embodiment of this application, the receiving unit 1105 of the first port may be implemented by the receive interface 1305 of the first port in the foregoing FIG. 7, the sending unit 1103 of the first port may be implemented by the transmit interface 1303 of the first port in the foregoing FIG. 7, the receiving unit 1107 of the second port may be implemented by the receive interface 1307 of the second port in the foregoing FIG. 7, the sending unit 1106 of the second port may be implemented by the transmit interface 1306 of the second port in the foregoing FIG. 7, and the processing unit 1102 may be implemented by the processor 1302 in the foregoing FIG. 7.

Figure 10:
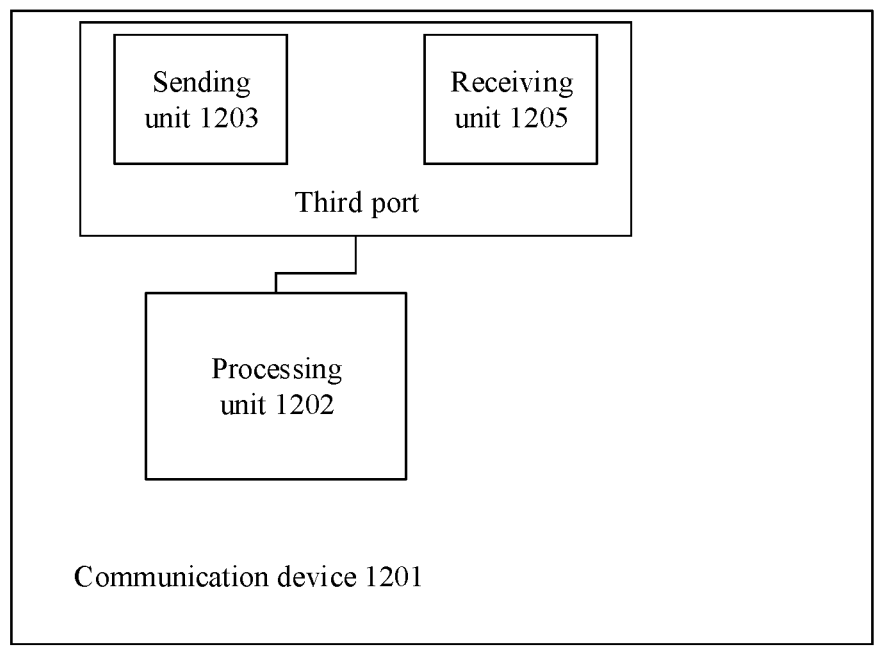
FIG. 10 is a schematic diagram of a structure of another communication device according to an embodiment of this application.

Based on the foregoing embodiments and the same concept, FIG. 10 is a schematic diagram of a communication device according to an embodiment of this application. As shown in FIG. 10, the communication device 1201 may be a network device, or a chip or a circuit, such as a chip or a circuit that can be disposed on a network device.

If the communication device 1201 corresponds to the second device in the foregoing method, the communication device may include a processing unit 1202, a receiving unit 1205 of a third port, and a sending unit 1203 of the third port. The receiving unit 1205 of the third port is configured to receive a first continuity check message from a first port of a first device, where the first continuity check message carries first indication information, and the first indication information indicates that a link corresponding to a receiving unit of a port that sends the first indication information is in the fault status. The sending unit 1203 of the third port is configured to: for a second data packet to be sent by the sending unit 1203 of the third port, send the second data packet to the receiving unit 1205 of the third port.

For concepts, explanations, detailed descriptions, and other steps of the communication device that are related to the technical solutions provided in embodiments of this application, refer to the descriptions of the content in the foregoing method or other embodiments. Details are not described herein again.

It may be understood that, for functions of the units in the foregoing communication device 1201, refer to implementation of corresponding method embodiments. Details are not described herein again.

It should be understood that division into the foregoing units of the communication device is merely logical function division. During actual implementation, all or a part of the units may be integrated into one physical entity, or may be physically separated. In this embodiment of this application, the receiving unit 1205 of the third port may be implemented by the receive interface 1405 of the third port in the foregoing FIG. 8, the sending unit 1203 of the third port may be implemented by the transmit interface 1403 of the third port in the foregoing FIG. 8, and the processing unit 1202 may be implemented by the processor 1402 in the foregoing FIG. 8.

Based on the method provided in embodiments of this application, this application further provides a computer program product. The computer program product includes computer program code. When the computer program code is run on a computer, the computer is enabled to perform the method in any one of the embodiments shown in FIG. 3.

According to the method provided in embodiments of this application, this application further provides a computer-readable storage medium. The computer-readable medium stores program code. When the program code is run on a computer, the computer is enabled to perform the method in any one of the embodiments shown in FIG. 3.

According to the method provided in embodiments of this application, this application further provides a system, including the foregoing one or more network devices, for example, including the first device, the second device, and the third device in the foregoing content.

All or some of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on a computer, procedures or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (digital video disc, DVD)), a semiconductor medium (for example, a solid state drive (solid-state drive, SSD)), or the like.

The network device in the foregoing apparatus embodiments corresponds to the network device in the method embodiments. A corresponding module or unit performs a corresponding step. For example, a communication unit (a transceiver) performs a receiving step or a sending step in the method embodiments, and a step other than the sending step and the receiving step may be performed by a processing unit (a processor). For a function of a specific unit, refer to a corresponding method embodiment. There may be one or more processors.

Terminologies such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, an execution thread, a program, and/or a computer. As illustrated by using figures, both a computing device and an application that runs on the computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and based on, for example, a signal having one or more data packets (for example, data from two components interacting with another component in a local system, a distributed system, and/or across a network such as the Internet interacting with other systems by using the signal).

A person of ordinary skill in the art may be aware that, in combination with illustrative logical blocks (illustrative logical block) described in embodiments disclosed in this specification and steps (step) may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed systems, apparatuses, and methods may be implemented in another manner. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical form, a mechanical form, or other forms.

The units described as separate parts may or may not be physically separate, and parts displayed as units may or may not be physical units, in other words, may be located in one position, or may be distributed on a plurality of network units. Some or all of the units may be selected based on actual requirements to achieve the objectives of the solutions in embodiments.

In addition, functional units in embodiments of this application may be integrated into one processing unit, or each of the units may exist alone physically, or two or more units are integrated into one unit.

When functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The foregoing storage medium includes: any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A troubleshooting method, comprising:
   determining, by a first device, that a link corresponding to a receiver of a first port of the first device is in a fault status; and
   in response to the determination that the link corresponding to the receiver of the first port is in the fault status, sending, by the first device, a first continuity check message to a second device via a transmitter of the first port, wherein the first continuity check message carries first indication information, and the first indication information indicates that a link corresponding to a receiver of a port that sends the first indication information is in the fault status; and
   wherein, after the determining, by a first device, that a link corresponding to a receiver of a first port is in a fault status, the method further comprises:
      for a first data packet to be sent by the transmitter of the first port, sending, by the first device, the first data packet to the receiver of the first port via the transmitter of the first port.

2. The method according to claim 1, wherein the first device further comprises a second port, the first device is connected to the second device via the first port, and the first device is connected to a third device via the second port; and the method further comprises:
   determining, by the first device, that a link corresponding to a receiver of the second port is in a non-fault status; and
   in response to the determination that the link corresponding to the receiver of the second port is in the non-fault status, sending, by the first device, a fifth continuity check message to the third device via a transmitter of the second port, wherein the fifth continuity check message carries second indication information, and the second indication information indicates that a link corresponding to a receiver of a port that sends the second indication information is in the non-fault status.

3. The method according to claim 2, wherein, after the sending, by the first device, a first continuity check message via a transmitter of the first port, the method further comprises:
   if the first device receives a third continuity check message via the first port, wherein the third continuity check message carries the first indication information:
      for a first data packet to be forwarded by the transmitter of the first port, sending, by the first device, the first data packet to the receiver of the first port via the transmitter of the first port; and
      sending, by the first device, a second continuity check message to the second device via the transmitter of the first port, wherein the second continuity check message carries second indication information, and the second indication information indicates that the link corresponding to the receiver of the port that sends the second indication information is in the non-fault status.

4. The method according to claim 1, wherein the determining, by a first device, that a link corresponding to a receiver of a first port is in a fault status comprises:
   determining, by the first device, that a link corresponding to the receiver of the first port is in a fault status if either of the following conditions is satisfied:
      a total quantity of third continuity check packets and fourth continuity check packets received via the first port within preset first duration is not greater than a first quantity, wherein the third continuity check packet carries the first indication information, the fourth continuity check packet carries second indication information, and the second indication information indicates that the link corresponding to the receiver of the port that sends the second indication information is in a non-fault status; or
      the link corresponding to the receiver of the first port is in a disconnected status.

5. The method according to claim 1, wherein after the determining, by a first device, that a link corresponding to a receiver of a first port is in a fault status, the method further comprises:
   if the first device receives a second quantity of fourth continuity check messages via the first port, wherein the fourth continuity check message carries second indication information, and the second indication information indicates that the link corresponding to the receiver of the port that sends the second indication information is in a non-fault status:
      sending, by the first device, the second continuity check message to the second device via the transmitter of the first port, wherein the second continuity check message carries the second indication information, and the second indication information indicates that the link corresponding to the receiver of the port that sends the second indication information is in the non-fault status.

6. The method according to claim 5, wherein, after the first device receives a second quantity of fourth continuity check messages via the first port, the method further comprises:
for a first data packet to be sent by the transmitter of the first port, sending, by the first device, the first data packet to the second device via the first port.

7. A communication device, comprising:
a first port, wherein the first port comprises a transmitter and a receiver; and
at least one processor configured to determine that a link corresponding to the receiver of the first port is in a fault status, wherein
the transmitter of the first port is configured to:
send a first continuity check message to a second device in response to the determination that the link corresponding to the receiver of the first port is in the fault status, wherein the first continuity check message carries first indication information, and the first indication information indicates that a link corresponding to a receiver of a port that sends the first indication information is in the fault status; and
after the determination that the link corresponding to the receiver of the first port is in a fault status, for a first data packet to be sent by the transmitter of the first port, send the first data packet to the receiver of the first port.

8. The device according to claim 7, wherein the communication device further comprises a second port, and the second port comprises
a transmitter and a receiver;
the first port is connected to the second device, and the second port is connected to a third device;
the processor is further configured to determine that a link corresponding to a receiver of the second port is in a non-fault status; and
the transmitter of the second port is configured to send a fifth continuity check message to the third device, wherein the fifth continuity check message carries second indication information, and the second indication information indicates that a link corresponding to a receiver of a port that sends the second indication information is in the non-fault status.

9. The device according to claim 7, wherein if the receiver of the first port is configured to receive a third continuity check message, wherein the third continuity check message carries the first indication information,
the transmitter of the first port is further configured to:
for a first data packet to be forwarded by the transmitter of the first port, send the first data packet to the receiver of the first port; and
send a second continuity check message to the second device via the transmitter of the first port, wherein the second continuity check message carries second indication information, and the second indication information indicates that the link corresponding to the receiver of the port that sends the second indication information is in a non-fault status.

10. The device according to claim 7, wherein when the processor determines the link corresponding to the receiver of the first port is in the fault status, the processor is configured to:
if either of the following conditions is satisfied, determine that the link corresponding to the receiver of the first port is in the fault status:
a total quantity of third continuity check packets and fourth continuity check packets received via the first port within preset first duration is not greater than a first quantity, wherein the third continuity check packet carries the first indication information, the fourth continuity check packet carries second indication information, and the second indication information indicates that the link corresponding to the receiver of the port that sends the second indication information is in a non-fault status; or
the link corresponding to the receiver of the first port is in a disconnected status.

11. The device according to claim 7, wherein if the receiver of the first port is further configured to receive a second quantity of fourth continuity check messages, wherein the fourth continuity check message carries second indication information, and the second indication information indicates that the link corresponding to the receiver of the port that sends the second indication information is in a non-fault status, the transmitter of the first port is further configured to send a second continuity check message to the second device, wherein the second continuity check message carries the second indication information, and the second indication information indicates that the link corresponding to the receiver of the port that sends the second indication information is in the non-fault status.

12. The device according to claim 11, wherein the transmitter of the first port is further configured to:
for a first data packet to be sent by the transmitter of the first port, send the first data packet to the second device via the transmitter of the first port.

13. A non-transitory computer-readable storage medium, wherein the non-transitory computer-readable storage medium stores programming instructions that, when executed by at least one processor, cause the at least one processor to perform operations comprising:
determining that a link corresponding to a receiver of a first port of a first device is in a fault status; and
in response to the determination that the link corresponding to the receiver of the first port is in the fault status, sending a first continuity check message to a second device via a transmitter of the first port, wherein the first continuity check message carries first indication information, and the first indication information indicates that a link corresponding to a receiver of a port that sends the first indication information is in the fault status; and
wherein, after the determining that a link corresponding to a receiver of a first port is in a fault status, the operations further comprising:
for a first data packet to be sent by the transmitter of the first port, sending the first data packet to the receiver of the first port via the transmitter of the first port.

14. The non-transitory computer-readable storage medium according to claim 13, wherein the first device comprises a second port, the first device is connected to the second device via the first port, and the first device is connected to a third device via the second port; and
the operations further comprising:
determining that a link corresponding to a receiver of the second port is in a non-fault status; and
in response to the determination that the link corresponding to the receiver of the second port is in the non-fault status, sending a fifth continuity check message to the third device via a transmitter of the second port, wherein the fifth continuity check message carries second indication information, and the second indication information indicates that a link corresponding to a receiver of a port that sends the second indication information is in the non-fault status.

15. The non-transitory computer-readable storage medium according to claim 14, wherein, after the sending a first continuity check message via a transmitter of the first port, the operations further comprising:
if the first device receives a third continuity check message via the first port, wherein the third continuity check message carries the first indication information:
for a first data packet to be forwarded by the transmitter of the first port, sending the first data packet to the receiver of the first port via the transmitter of the first port; and
sending a second continuity check message to the second device via the transmitter of the first port, wherein the second continuity check message carries second indication information, and the second indication information indicates that the link corresponding to the receiver of the port that sends the second indication information is in the non-fault status.

16. The non-transitory computer-readable storage medium according to claim 13, wherein the determining that a link corresponding to a receiver of a first port is in a fault status comprises:
determining that a link corresponding to the receiver of the first port is in a fault status if either of the following conditions is satisfied:
a total quantity of third continuity check packets and fourth continuity check packets received via the first port within preset first duration is not greater than a first quantity, wherein the third continuity check packet carries the first indication information, the fourth continuity check packet carries second indication information, and the second indication information indicates that the link corresponding to the receiver of the port that sends the second indication information is in a non-fault status; or
the link corresponding to the receiver of the first port is in a disconnected status.

17. The non-transitory computer-readable storage medium according to claim 13, wherein after the determining that a link corresponding to a receiver of a first port is in a fault status, the operations further comprising:
if the first device receives a second quantity of fourth continuity check messages via the first port, wherein the fourth continuity check message carries second indication information, and the second indication information indicates that the link corresponding to the receiver of the port that sends the second indication information is in a non-fault status:
sending the second continuity check message to the second device via the transmitter of the first port, wherein the second continuity check message carries the second indication information, and the second indication information indicates that the link corresponding to the receiver of the port that sends the second indication information is in the non-fault status.

18. The non-transitory computer-readable storage medium according to claim 17, wherein, after the first device receives a second quantity of fourth continuity check messages via the first port, the operations further comprising:
for a first data packet to be sent by the transmitter of the first port, sending the first data packet to the second device via the first port.

\* \* \* \* \*